United States Patent
Hirabayashi

(10) Patent No.: US 9,353,720 B2
(45) Date of Patent: May 31, 2016

(54) STARTER ADAPTED TO IDLE STOP SYSTEM OF VEHICLE

(71) Applicant: DENSO CORPORATION, Kariya, Aichi-pref. (JP)

(72) Inventor: Takashi Hirabayashi, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 259 days.

(21) Appl. No.: 14/256,362

(22) Filed: Apr. 18, 2014

(65) Prior Publication Data

US 2014/0311434 A1    Oct. 23, 2014

(30) Foreign Application Priority Data

Apr. 23, 2013    (JP) ................................. 2013-090247

(51) Int. Cl.
| | |
|---|---|
| *H02P 1/54* | (2006.01) |
| *F02N 11/08* | (2006.01) |
| *F02N 11/10* | (2006.01) |
| *F02N 15/06* | (2006.01) |

(52) U.S. Cl.
CPC .......... *F02N 11/087* (2013.01); *F02N 11/0825* (2013.01); *F02N 11/0851* (2013.01); *F02N 11/108* (2013.01); *F02N 15/067* (2013.01); *F02N 2200/14* (2013.01); *Y02T 10/48* (2013.01)

(58) Field of Classification Search
CPC ....................................................... H02P 1/26
USPC .................................................... 318/101, 34
See application file for complete search history.

(56) References Cited

U.S. PATENT DOCUMENTS

| | | | | |
|---|---|---|---|---|
| 6,249,419 B1 * | 6/2001 | Casellato | ............ | F02N 11/0851 307/10.6 |
| 2010/0251852 A1 | 10/2010 | Murata et al. | | |
| 2011/0140813 A1 | 6/2011 | Suzuki et al. | | |
| 2014/0041613 A1 | 2/2014 | Murata et al. | | |

FOREIGN PATENT DOCUMENTS

| | | |
|---|---|---|
| JP | A-2011-142067 | 7/2011 |
| JP | A-2011-144799 | 7/2011 |

* cited by examiner

*Primary Examiner* — David S Luo

(74) *Attorney, Agent, or Firm* — Oliff PLC

(57) ABSTRACT

An electromagnetic solenoid that controls a motor current of a starter includes: a first switch including first fixed contacts and a first movable contact, intermitting the motor current; a suppression resistor that suppresses the motor current; a second switch including second fixed contacts and a second movable contact, making a short circuit path to bypass the suppression resistor; a first regulation member being driven by a first solenoid, regulating the first switch being closed and releasing the first switch from being regulated after predetermined time elapses; and a second regulation member being driven by a second solenoid, regulating the second switch being closed and releasing the second switch from being regulated after predetermined time elapses when the first switch is released from regulated state. The first and second regulation members are disposed between a regulated position and a released position to regulate the first and second switches.

16 Claims, 15 Drawing Sheets

(IV—IV)

(V—V)

STARTER ADAPTED TO IDLE STOP SYSTEM OF VEHICLE

CROSS-REFERENCE TO RELATED APPLICATION

This application is based on and claims the benefit of priority from earlier Japanese Patent Application No. 2013-90247 filed Apr. 23, 2013, the description of which is incorporated herein by reference.

BACKGROUND

1. Technical Field

The present disclosure relates to a starter to start an engine mounted on a vehicle, and more particularly to a starter adapted to an idle stop system of a vehicle.

2. Description of the Related Art

Recently, to reduce carbon dioxide emission and improve the fuel efficiency, vehicles provided with an idle stop system (hereinafter referred to ISS) that automatically stops and restarts the engine has been increased. In such vehicles, the starter is provided with an electromagnetic solenoid that integrates functions that the pinion is pushed out in response to a movement of the plunger, current flowing through the motor is enabled/disabled and rush current is suppressed when the motor is activated.

The conventional type starter to start the engine is not capable of restarting the engine until the engine is completely stopped when the idle stop function is performed, that is, the engine cannot be restarted while the engine is rotating by inertial rotation.

According to the conventional type starter, one solenoid switch (referred to non-ISS switch in this disclosure) controls the pinion to be pushed out towards the ring gear side of the engine and a main switch used to intermit the motor current to be ON and OFF.

Meanwhile, for example, Japanese Patent Application Laid-Open Publication No. 2011-144799 discloses a starter provided with a tandem solenoid switch (hereinafter is referred to ISS switch) which is capable of restarting the engine in response to an restart request by the driver. The ISS switch includes a solenoid SL1 used for pushing the pinion out and a solenoid SL2 used to open and close the main contact point and both solenoids are configured to be controlled individually. In other words, since the operation that the solenoid SL1 pushes the pinion out and the operation that the solenoid SL2 opens/closes the main switch can be controlled individually, even though the engine is rotating inertially, the engine can be restarted by engaging the pinion with ring gear.

Since vehicles having ISS stop the engine every time when the vehicle has to stop at an intersection due to a red signal or due to a traffic jam, and restart the engine in response to a restart request, the frequency of the engine start operation is significantly increased. In this respect, a problem arises that a large amount of current (referred to as starting current or rush current) flows when the motor is activated in response to the engine restart request after the idle stop operation is performed. Specifically, when a large amount of current flows, the terminal voltage of the battery is greatly decreased so that instantaneous power failure occurs in the vehicle, whereby electric equipment such as meters, audio equipment or a navigation system momentarily stop operation. Generally, since the vehicle provided with the ISS performs the idle stop on the road, a large amount of current flows every time when the starter operates so that the driver may be stressed significantly from this phenomena.

To avoid occurrence of the instantaneous power failure, a suppression resistor is employed. For example, Japanese Patent Application Laid-Open Publication No. 2011-142067 discloses a technique in which an electromagnetic relay (referred to ICR (In-rush current reduction) relay) that integrates a suppression resistor is connected to an activation circuit of the motor and a low resistance circuit path and a high resistance circuit path are controlled to be switched therebetween in response to the relay contact being ON and OFF. This ICR relay forms high resistor circuit path including the suppression resistor when the ICR relay is opened (turned OFF) in response to activation of the motor. As a result, suppressed current flows into the motor from the battery through the suppression resistor, whereby significant voltage drop at the terminal of the battery can be avoided. Subsequently, when the relay contact is closed (turned ON), both ends of the suppression resistor are short-circuited to form the low resistor circuit path, whereby the whole battery voltage is applied to the motor.

However, a conventional type switch used for the ISS individually controls each of the solenoids regardless of the sequence of operations thereof so that a large enough heat capacity that meets the rate of operation of the starter and its margin value are necessary for both solenoids SL1 and SL2. Hence, sizes of both solenoids become larger in order to secure heat resistance. Further, since the solenoids SL1 and SL2 are controlled by a vehicle side ECU (electronic control unit), two terminals (hereinafter is referred to terminal-50) are necessary to supply power to both solenoids SL1 and SL2. In other words, as shown in FIG. 16, the terminal-50 T1 for SL1 and the terminal-50 for terminal SL2 are disposed separately so that sizes of the terminal-50 T1 and the terminal-50 T2 become larger. Therefore, the mountability to the vehicle side is degraded and the system cost will increase since two harnesses and the starter relays which are connected to the terminal-50 T1 and T2 are required for the two terminals T1 and T2.

Moreover, to secure a performance of the engaging between the pinion and the ring gear as similar to that of the non-ISS switch, the current required to hold the plunger of the solenoid SL1 becomes larger compared to that of the non-ISS switch. Accordingly, depending on the type of vehicle, fuse capacity of the terminal-50 for the harness is required to be larger and wire diameter of the harness is required to be increased, thereby increasing the system cost of the ISS unit. Since the ICR relay conventionally used is an individual component, it is necessary to prepare a signal line in order to operate the ICR relay and a harness to connect the ICR relay and the starter, so that necessary man-hours and the number of components are increased, thereby increasing the system cost. Further, the ICR relay and the starter are connected by an additional harness whereby wiring resistance increases due to the additional harness. As a result, since the output power of the starter is decreased, depending on types of vehicles, it is necessary to use a starter having larger output power compared to conventionally used starters.

Furthermore, since a fixing portion to fix the ICR relay is required to be disposed in the starter housing or the vehicle side, depending on types of vehicles, the fixing portion may not be disposed in the vehicle. In FIG. 16, an example that the ICR relay is fixed to the starter housing 139 is illustrated. Specifically, the ICR relay is fixed to the starter housing 139 together with the ISS switch 120 by a bolt 140. When the ICR relay is required to be disposed at battery side with respect to the B terminal (i.e., a bolt to which the battery cable is connected) of the electromagnetic switch, voltage is always applied to the connection terminal of the ICR relay. Therefore, to avoid an unnecessary short circuit caused by a foreign body or a tool contacting to the connection terminal of the ICR relay, a protection cover is necessary to cover the connection terminal. As a result, necessary man-hour and the number of components are further increased so that the system cost will be increased.

SUMMARY

The embodiment provides a starter provided with a small-size/light-weight electromagnetic solenoid unit that is adapted to an idle stop function and that integrates an in-rush current suppression function.

As a first aspect of the embodiment, a starter according to the present disclosure includes: a motor that generates rotational force by being energized, a pinion that transmits the rotational force of the motor to a ring gear of the engine when the pinion engages with the ring gear; and an electromagnetic solenoid fixed to a starter housing to be disposed parallel to the motor.

The electromagnetic solenoid includes:

a pair of first fixed contacts disposed at an activation circuit of the motor;

a first movable contact facing the pair of first fixed contacts, being movable in the axial direction to open and close the pair of first fixed contacts, the pair of first fixed contacts being closed when the first movable contact contacts with the pair of first fixed contacts and the pair of first fixed contacts being opened when the first movable contact is separated from the pair of first fixed contacts;

a first switch that intermits a current supplied to the motor in response to the first movable contact opening and closing the pair of first fixed contacts, the first switch being opened when the first movable contact opens the pair of first fixed contacts and being closed when the first movable contact closes the pair of first fixed contacts;

a suppression resistor connected to the activation circuit to be in series to the first switch, suppressing rush current flowing into the activation circuit when the first switch is closed;

a pair of second fixed contacts disposed at the activation circuit, bypassing the suppression resistor;

a second movable contact facing the pair of second fixed contacts, being movable in the axial direction to open and close the pair of second fixed contacts, the pair of second fixed contacts being closed when the second movable contact contacts with the pair of second fixed contacts and the pair of second fixed contacts being opened when the second movable contact is separated from the pair of second fixed contacts;

a second switch that short-circuits the suppression resistor to make a short circuit path when the second movable contact closes the pair of second fixed contacts, the second switch releasing the short circuit path when the second movable contact opens the pair of second fixed contacts, the second switch being opened when the second movable contact opens the pair of second fixed contacts and being closed when the second movable contact closes the pair of second fixed contacts;

a plunger forming a main electromagnet when being energized, the plunger being pulled by the main electromagnet to move in the axial direction;

a main solenoid that pushes the pinion out towards the ring gear in response to the plunger moving in the axial direction and drives the first movable contact and the second movable contact towards the pair of first fixed contacts and the pair of second fixed contacts;

a first regulation member disposed to be movable between a regulated position and a released position, the regulated position regulating movement of the first movable contact not to contact with the pair of first fixed contacts in response to the first switch being closed, the released position releasing movement of the first movable contact so as to allow the first movable contact to contact with the pair of first fixed contacts;

a second regulation member disposed to be movable between a regulated position and a released position, the regulated position regulating movement of the second movable contact not to contact with the pair of second fixed contacts in response to the second switch being closed, the released position releasing movement of the second movable contact from the regulated position so as to allow the second movable contact to contact with the pair of second fixed contacts;

a first solenoid forming a first electromagnet when being energized, driving the first regulation member to be at the regulated position when the first electromagnet is ON and releasing the first regulation member to be at the released position when the first electromagnet is OFF; and a second solenoid forming a second electromagnet when being energized, driving the second regulation member to be at the regulated position when the second electromagnet is ON and releasing the second regulation member to be at the released position when the second electromagnet is OFF.

The first solenoid is configured to control the first electromagnet to be ON and OFF such that the first regulation member is driven to be at the regulated position before the first switch is closed when the main solenoid starts to operate, so as to regulate the movement of the first movable contact and the first regulation member is released to be at the released position when a predetermined time elapses after the plunger is pulled by the main electromagnet, so as to release the movement of the first movable contact; the second solenoid is configured to control the second electromagnet to be ON and OFF such that the second regulation member is driven to be at the regulated position before the second switch is closed when the main solenoid starts to operate, so as to regulate the movement of the second movable contact and the second regulation member is released to be at the released position when a predetermined time elapses after the first regulation member releases the movement of the first movable contact, so as to release the movement of the second movable contact.

The electromagnetic solenoid according to the present disclosure is able to regulate movements of the first and second movable contacts by operations of the first and second solenoids before the first and second solenoids are closed in response to operation of the main solenoids. Specifically, timing for energizing the first and the second solenoids are individually controlled so that a predetermined period from when the pinion is pushed out towards the ring gear side in response to a movement of the plunger to when the first switch is closed can be set. Moreover, a predetermined period from when the first switch is close to when the second switch is closed can be set. As a result, an electromagnetic solenoid having a function of the conventional ISS switch and a function of the ICR relay (i.e., a function for suppressing the rush current when motor is activated) can be constituted. Regarding the first and the second solenoid, since the operating time required for the first and second regulation members being released from the regulated position after driving the first and second regulation members to be at the regulated position is short (e.g., more than approx. 10 milliseconds and up to approx. 200 milliseconds), heat generated by the first and the second solenoids being energized can be significantly reduced.

Also, regarding the first and the second solenoids, when the first and the second regulation member are driven to be at the regulated position thereby regulating the movements of the first and the second movable contacts, a movement of the plunger itself of the main solenoids is not regulated. Therefore, regulation forces of the first and the second solenoids required for regulating the first and the second movable contacts do not necessarily exceeds the force of the main electromagnetic solenoid being applied to the plunger, whereby the first and second solenoids can be shrunk. Further, while the first solenoid is operating, that is, while the movement of the first movable contact is regulated by the first regulating member, the first movable contact and the first fixed contacts do not contact each other so that the battery voltage is not applied to the motor. In other words, the motor is not powered while the first solenoids is operating, significant voltage drop of the battery voltage due to the rush current will not occur. As a result, since it is not necessary to consider occurrence of voltage drop due to the rush current triggered by operation of the first solenoid, the first solenoid can be further shrunk.

While the second solenoid is operating, the second movable contact is regulated so that the second switch is opened. Hence, power is supplied to the motor from the battery via the suppression resistor when the first switch is closed because the first movable contact is released from the regulated position by the first solenoid. Thus, a function of the ICR relay (i.e., an amount of rush current when the first switch is closed can be significantly reduced by the suppression resistor) can be implemented to the starter. As a result, since influence of the voltage drop due to the rush current can be reduced, the second solenoid can be further shrunk. The first and the second solenoids have a configuration in which the plungers are pushed out when the first and the second electromagnet are formed so as to drive the first and the second regulation members are driven to be at the regulated positions. Accordingly, if a fault occurs in the first solenoid, that is, the first solenoid does not work even when power is supplied, the first regulation member is not driven to be at the regulated position. Similarly, when the second solenoid does not operate even when power is supplied to the second solenoid, the second regulation member is not driven to be at the regulated position. In this case, the electromagnet solenoid can be operated as similarly to that of the non-ISS switch. Hence, even when a fault occurs in either first or second solenoid, the fault does not immediately cause a malfunction of the starter operation. As a result, robustness of the electromagnetic solenoid can be enhanced.

Furthermore, the starter according to the present disclosure, since a function of the conventional ICR relay is integrated to the electromagnet solenoid, a harness that connects the electromagnetic solenoid and the ICR relay is not necessary, so that voltage drop at the harness (resistor-loss of the harness) becomes zero. As a result, compared to a case where the ICR relay and the starter are combined, the output capability of the starter can be enhanced. Also, the number of components is reduced so that system cost can be reduced and no areas for ICR relay to be mounted is necessary so that the mountability of the starter is improved.

DETAILED DESCRIPTION OF THE PREFERRED EMBODIMENTS

The embodiments of the present disclosure are now described in detail as follows.

First Embodiment

With reference to FIGS. 1 to 13, hereinafter is described the first embodiment.

Figure 1:
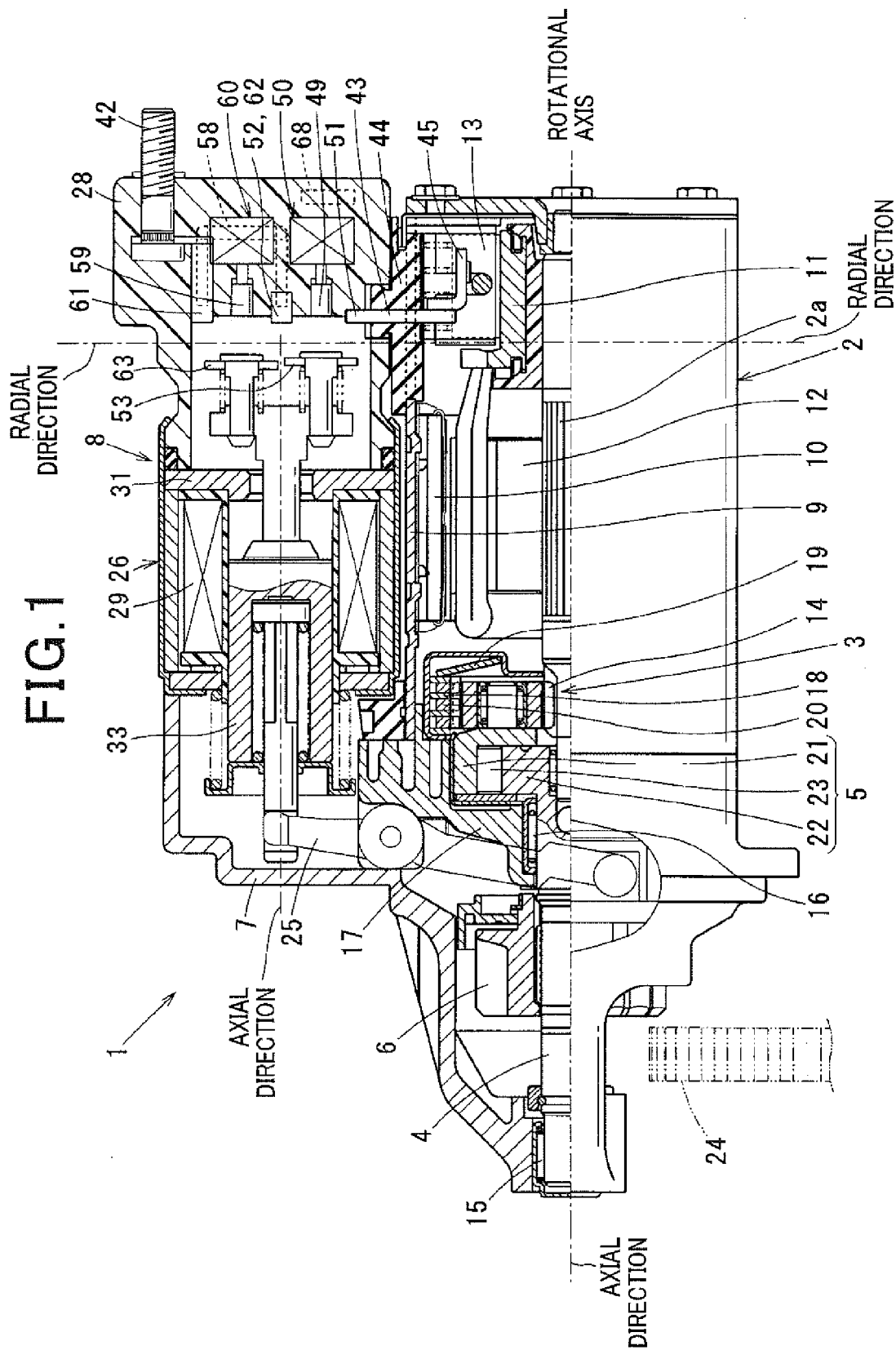
FIG. 1 is a diagram showing a half cross-section of the starter according to the embodiments of the present disclosure.

As shown in FIG. 1, the starter 1 according to the first embodiment includes a commutator motor 2 that generates rotational force by being energized, a reduction unit 3 that reduces the rotational speed of the motor 2, an output shaft 4 coupled to an armature shaft 2a of the motor 2, an impact absorber (described later) that absorbs excessive impact propagated from the engine side, a clutch 5 that transmits torque generated by the motor 2 and amplified by the reduction unit 3 to the output shaft 4, a pinion 6 disposed on the output shaft 4 and an electromagnetic solenoid 8 fixed to a starter housing 7 together with the motor 2. The motor 2 and the electromagnetic solenoid 8 are fixed to the starter housing 7 to be disposed parallel from each other such that the rotational axis of (armature shaft 2a) the motor 2 and the longitudinal direction (axial direction) of the electromagnetic solenoid 8 become parallel. The motor 2 includes a field element constituted by a plurality of permanent magnets 10 disposed on the inner periphery of a yoke 9 that forms magnetic circuit, an armature 12 provided with a commutator 11 at the end portion of the anti-reduction unit side (right side in FIG. 1) of the armature shaft 2a and a brush 13 disposed on the outer periphery of the commutator 11. As shown in FIG. 1, a permanent magneto type field element is shown, however, an electromagnetic type field element can be employed.

The reduction unit 3 is a well known planetary gear type reduction unit in which a plurality of planetary gears rotate around an own axis and revolve around the sun gear by receiving rotation of the armature shaft 2a. The output shaft 4 is disposed on the axis extended from the one of the armature shaft 2a of the motor 2 (same axis: the axial direction is indicated in FIG. 1), and one end portion of the output shaft 4 is rotatably supported by the starter housing 7 via a bearing 15 and the other end portion thereof is rotatably supported by a center case 17 via a bearing 16. The impact absorber is constituted by a fix plate 18 (rotation is regulated) and a friction plate 20 to be disposed alternately in which a disc spring 19 pushes the friction plate 20 so as to engage with the fix plate 20. The impact absorber absorbs impact when excessive torque is applied from engine side. Specifically, the friction plate 20 slips (rotates) to release friction force when excessive torque is applied from engine side so as to absorb the impact. It is noted that the friction plate 20 also serves as an internal gear of the reduction unit 3.

The clutch 5 includes an outer 21 that rotates by receiving revolving force of the planetary gear 14, an inner 22 disposed at inner periphery side of the outer 21 together with the output shaft 4 and a roller 23 that intermits transmission of the force between the outer 21 and the inner 22. The clutch 5 serves as a one way clutch unit where rotational torque is transmitted from the outer 21 to the inner 22 via the roller 23, and transmission of the torque between the inner 22 and the outer 21 is cut off by idle rotation of the roller 23. The pinion 6 is movably disposed on the outer periphery of the output shaft 4 by a helical spline-engagement. When the engine is required to start, the pinion 6 is engaged with the ring gear 24 (as shown in FIG. 1) so as to transmit the rotational torque of the motor 2 which is amplified by the reduction unit 3 to the ring gear 24.

Figure 2:
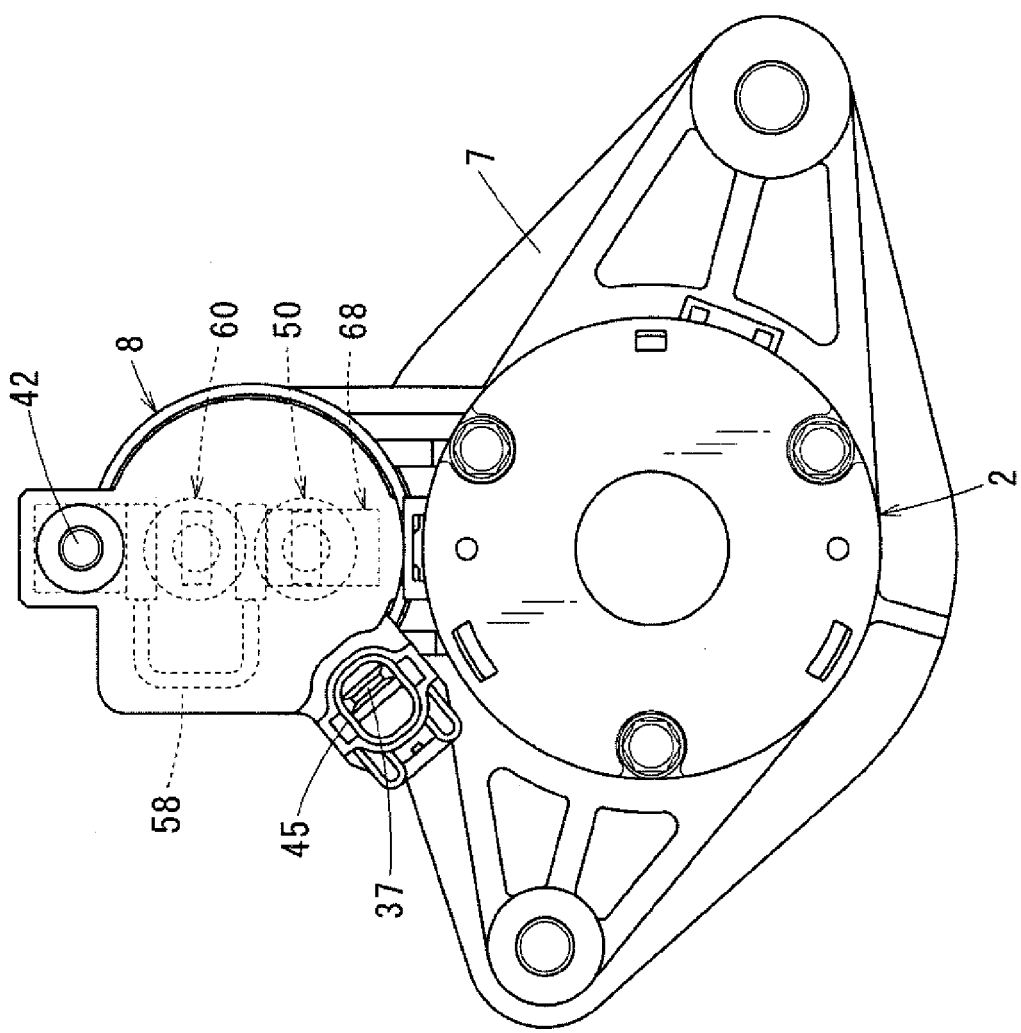
FIG. 2 is a diagram showing a rear view of the starter viewing from anti-pinion side with respect to the axial direction of the starter.
Figure 3:
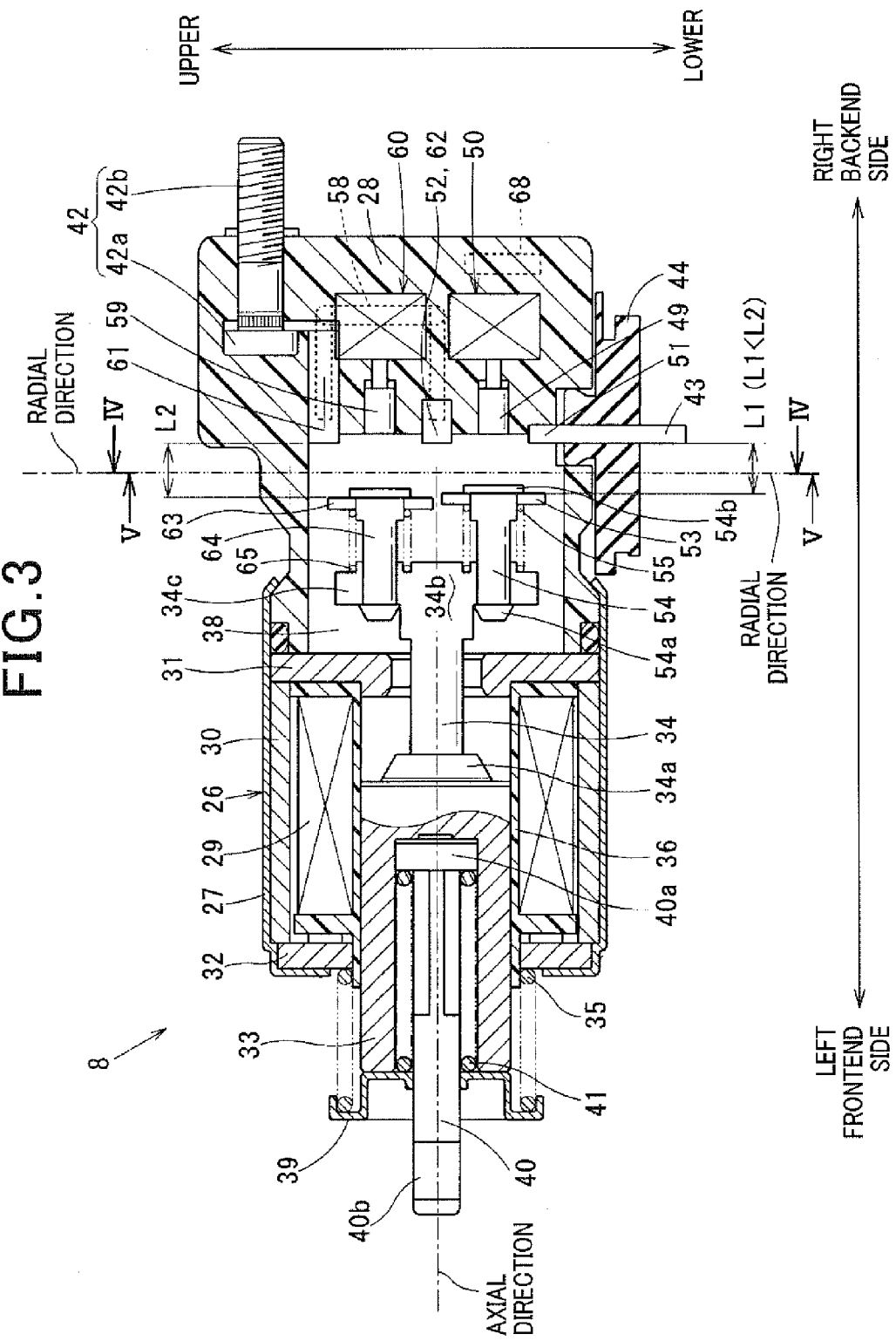
FIG. 3 is a diagram showing a cross-section of the electromagnetic solenoid.

Next, with reference to FIGS. 1 to 6, hereinafter is described a configuration of the electromagnetic solenoid 8. In the following description, the left side of the electromagnetic solenoid 8 as shown in FIG. 3 is defined as a front end side, and the right side thereof is defined as backend side. The longitudinal direction of the electromagnetic solenoid is defined as the axial direction indicated by a dotted line in FIGS. 1 and 3. The electromagnetic solenoid 8 is constituted by a main solenoid 26, a switch cover 28, a first contact unit and a second contact unit. The main solenoid 26 drives a shift lever 25 (FIG. 1) to push the pinion 6 out towards the ring gear 24 side. The switch cover 28 is fixed to a frame 27 so as to cover the opening of the frame 27. The frame 27 has a cylindrical shape and serving as a magnetic circuit of the main solenoid. The first contact unit and the second contact unit are disposed inside the switch cover 28. The main solenoid 26 includes a coil 29 that forms an electromagnet (hereinafter is referred to main electromagnet) by being energized, a cylindrical yoke disposed at the outer periphery of the coil 29, a fixed iron core 31 having circular shape disposed adjacent to the backend side of the coil 29, a fixed plate 32 having circular shape disposed adjacent to the frontend side of the coil 29, a plunger 33 that moves towards the axial direction in the inner periphery of the coil 29, a plunger rod 34 fixed to a backend face of the plunger 33 and a return spring 35 that urges the plunger 33 towards an anti-fixed iron core side (left side direction in FIG. 3).

Figure 6:
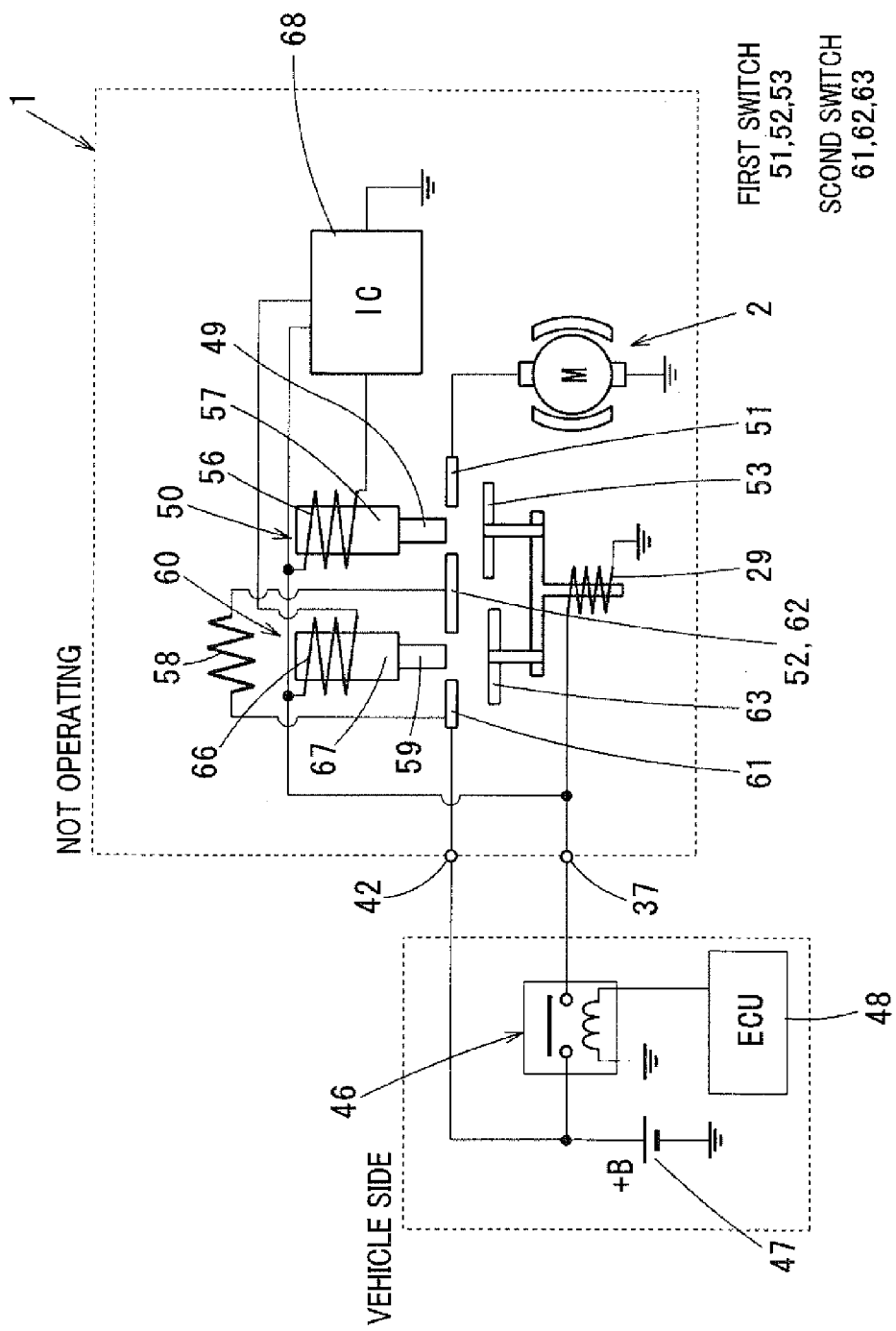
FIG. 6 is a circuit diagram of the starter.

The coil 29 is formed by being wound around the bobbin 36 which is made of resin. FIG. 6 is a diagram showing a circuit diagram of the starter while the starter is not operating. As shown in FIG. 6, one end portion of the coil 29 is connected to a conduction terminal (terminal-50 37 according to the first embodiment) and the other portion of the coil 29 is connected to, for example, the surface of the fixed iron core 31 to be grounded. Regarding the cylindrical yoke 30, the backend in the axial direction comes into contact with the fixed iron core 31 and the frontend in the axial direction comes into contact with the fixed plate 32 whereby a flux path is formed between the fixed iron core 31 and the fixed plate. The fixed iron core 31 is disposed such that an inner periphery side in the radial direction extends to be within the inner diameter of the bobbin 36 and faces the plunger 33 in the axial direction. The fixed plate 32 is formed by ferromagnetics such as iron as similar to that of the fixed iron core 31. The fixed plate 32 is magnetized when the main electromagnet is formed.

In the plunger 33, a cylindrical hole is formed in the inner periphery of the plunger 33 to have a bottomed cylindrical shape such that a bottomed surface is formed at the backend side of the cylindrical hole and an opening is formed at the frontend side of the cylindrical hole. Regarding the plunger rod 34, a flange portion 34a is disposed at the frontend side in the axial direction and the flange portion 34a is fixed to the end face of the plunger 33 by welding or bonding. The plunger rod 34 is extended in the axial direction through the inner periphery of the cylindrical hole being opened at the center portion of the fixed iron core and the end portion of anti-plunger side (backend side) extends to be in a contact point room 38 formed inside the switch cover 28. At the end portion of the anti-plunger side, a large rod portion 34b having larger rod diameter is disposed. Further, a holding disc 34c being extended in both radial directions (both upper/lower side in FIG. 3) of the large rod portion 34b is disposed together with the large rod portion 34b. Regarding the return spring 35, the backend in the axial direction thereof is supported by the anti-coil side end face and the frontend in the axial direction thereof is supported by a spring receiving portion 39 which is fixed to the frontend face of the plunger 33.

In the cylindrical hole formed at the plunger 33, a joint 40 that transmits a movement of the plunger 33 in the axial direction thereof to the shift lever 25 and a drive spring 41 disposed at outer periphery of the joint 40 are inserted to the cylindrical hole of the plunger 33. The joint 40 include a flange portion 40a disposed at the backend portion thereof. The flange portion 40a receives force of the drive spring 41 whereby the flange portion 40a is pushed to the bottom surface of the cylindrical hole. Moreover, an engaging groove 40b is formed at the frontend portion of the joint 40 protruded from the cylindrical hole of the plunger 33. By this engaging groove 40b, the end portion of the shift lever 25 is engaged with the engaging groove 40b in a forked shape (FIG. 1). The drive spring 41 is compressed while the plunger 33 is pulled by the fixed iron core 31 being magnetized with the main electromagnet so as to hold reaction force used for pushing the pinion 6 out towards the ring gear 24.

In the switch cover 28, two connection terminals including a first connection terminal 42 and a second connection terminal 43 which are connected to the activation circuit of the motor 2 and the above-described terminal-50 37 are disposed. The first connection terminal 42 corresponds to B terminal 42 to which a battery-harness is connected and the second connection terminal 43 corresponds to M terminal connected to the motor 2. As shown in FIG. 3, the B terminal 42 has a bolt-shape having a bolt head 42a and a male screw portion 42b in which the bolt head 42a is embedded to the switch cover 28 and the male screw portion 42b is protruded in the axial direction from the backend portion of the switch cover 28.

The M terminal 43 is formed by a plate-shaped member being made by metal, e.g. cupper. The plate-shaped member is held by a grommet 44 made by rubber and disposed through the contact point room 38 of the switch cover 28 and inside the motor 2 to be extended in the radial direction. Specifically, as shown in FIG. 1, one end side of the plate-shaped member protruded from the grommet 44 is inserted to the contact point room 38 from the side surface of the switch cover 28 and the other end side of the plate-shaped member protruded from the grommet 44 is inserted into the motor 2 and then, the M terminal 43 is electrically connected to the brush 13 of the positive terminal side via a metal plate in the motor 2.

The terminal-50 37 is formed by, e.g., blade terminal having a flat-plate shape. As shown in FIG. 2, only one terminal-50 37 is projected from outside the switch cover 28 and a resin-made connector 45 formed together with the switch cover 28 is disposed around the terminal-50 37. As shown in FIG. 6, a harness connected to the battery 47 via a starter relay 46 is connected to the terminal-50 37 to which power is supplied from the battery 47 when the starter relay 46 is closed. The starter relay 46 is controlled to be closed by the vehicle side ECU 48 when the engine is restarted in response to a restart request of the driver after the idle stop is performed.

Figure 5:
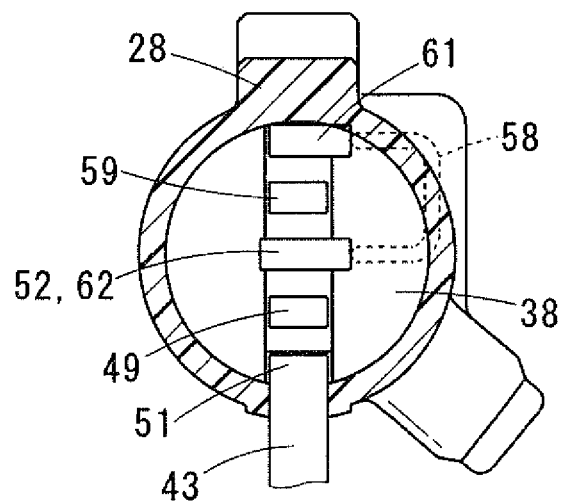
FIG. 5 is a diagram showing a cross-section at a line V-V of the electromagnetic solenoid as shown in FIG. 3.

The first contact unit includes a first switch that intermits the current supplied to the motor 2 and a first solenoid 50 that drives a first regulation member 49 so as to regulate the operation (close operation) of the first switch. The first switch is constituted by a pair of first fixed contacts 51 and 52, and a first movable contact 53 facing the first fixed contacts 51 and 52 and capable of moving in the axial direction. The first switch is closed when the first movable contact 53 moves towards the first fixed contacts 51 and 52 in the axial direction to come into contact with the pair of first fixed contacts 51 and 52. The first switch is opened while the first movable contact 53 does not contact with the first fixed contacts 51 and 52. In the first fixed contacts 51 and 52, one fixed contact 51 is disposed together with the above-described M terminal 43 to form the M fixed contact of the present disclosure. That is, as shown in FIG. 5, one end side of the M terminal 43 inserted to the contact point room 38 from the side surface of the switch cover 28 is formed as the one fixed contact 51. The other fixed contact 52 is fixed to the switch cover 28 with a predetermined distance apart from the one fixed contact 51 so as to form the M intermediate fixed contact of the present disclosure. The other fixed contact point 52 is hereinafter referred to the intermediate fixed contact 52.

The first movable contact 53 is supported by contact support member 54 disposed at one end side of the holding disc 34c included in the plunger rod 34c and movably disposed in the axial direction with respect to the contact support member 54. The first movable contact 53 is urged towards anti-holding member side (right side direction in FIG. 3) by a contact pressure spring 55 disposed between the first movable contact 53 and the holding disc 34c. The contact support member 54 has a cylindrical shape, being capable of engaging with the inner periphery of a circular hole (not shown) formed at the holding disc 34c to be slidable on the inner periphery thereof. The contact support member 54 is attached to the holding disc 34c to be movable in the axial direction with respect to the holding disc 34c. The contact support member 54 has a flange portion 54a at the frontend portion in the axial direction thereof. The flange portion 54a serves as a stopper to avoid the contact support member 54 slipping off from the circular hole. Meanwhile, at the backend portion in the axial direction of the contact support member 54, a flange portion 54b is disposed. The flange portion 54b serves as a stopper to avoid the first movable contact 53 which is urged by the contact pressure spring 55, being slipped off from the contact support member 54.

As shown in FIG. 3, the first regulation member 49 is disposed to face the first movable contact 53 in the axial direction. The first regulation member 49 is driven to be at a regulated position (described as follows) when the first solenoid 50 operates and returned to the released position while the first solenoid 50 is not operating. The regulated position is a position where movement of the first movable contact 53 is regulated when the first switch is closed, so as to allow the first movable contact 53 to come into contact with the first regulation member 49 while there is a gap between the first movable contact 53 and the first fixed contacts 51 and 52, thereby controlling the first movable contact 53 and the first fixed contacts 51 and 52 not to contact from each other. Specifically, the regulated position is located between the contact surface of the first movable contact 53 and the contact surface of the first fixed contacts 51 and 52. The released position is a position where the first movable contact 53 and the first fixed contacts 51 and 52 are allowed to contact from each other, when the first movable contact 53 is released from the regulated position. Specifically, the released position is located at anti-movable contact side with respect to the contact surface of the first fixed contacts 51 and 52.

As shown in FIG. 6, the first solenoid 50 includes a coil 56 that forms an electromagnet (hereinafter is referred to first electromagnet) when the first solenoid 50 is energized and a plunger 57 that moves towards the axial direction in response to ON/OFF operation of the first electromagnet. The first regulation member 49 operates linking with the plunger 57. It is noted that the ON/OFF operation of the first electromagnet is identical to the energizing/de-energizing of the coil 56. The first solenoid 50 pulls the plunger 57 to be stuck therewith before the first movable contact 53 comes into contact with the first regulation member 49, when the first solenoid 50 forms the first electromagnet to pull the plunger 57 thereby driving the first regulating member 49 to be at the regulated position. While the first solenoid 50 regulates movement of the first moveable contact 53, the pressing load of the contact pressure spring 55 that presses the first movable contact 53 is obviously smaller than the force that regulates the movement of the first movable contact 53 (i.e., regulation force).

The second contact unit includes a suppression resistor 58 connected in series to the first switch to be connected to an activation circuit of the motor 2, a second switch disposed in the activation circuit, bypassing the suppression resistor 58 and a second solenoid 60 that drives a second regulation member 59 so as to regulate the operation (close operation) of the second switch. The suppression resistor 58 suppresses the current flowing into the motor 2 when the first switch is closed to supply power to the motor 2 from the battery 47. The second switch is constituted by a pair of second fixed contacts 61 and 62, and a second movable contact 63 facing the second fixed contacts 61 and 62 and capable of moving in the axial direction. The second switch is closed when the second movable contact 63 moves towards the second fixed contacts 61 and 62 in the axial direction to come into contact with the pair of second fixed contacts 61 and 62. The second switch is opened while the second movable contact 63 does not contact with the second fixed contacts 61 and 62. The second switch forms a short circuit path that short-circuits both ends of the suppression resistor 58 when the second movable contact 63 contacts with the second fixed contacts 61 and 62, and releases the short circuit path when the second movable contact 63 moves away from the second fixed contacts 61 and 62.

Among the second fixed contacts 61 and 62, as shown in FIG. 3, the second fixed contact 61 is electrically connected to the B terminal 42 which is fixed to the switch cover 28 so as to form the B fixed contact of the present disclosure. As shown in FIG. 5, the second fixed contact 62 is fixed to the switch cover 28 to have a predetermined interval from the second fixed contacts 61, whereby a B intermediate fixed contact of the present disclosure is formed. The fixed contact 62 is hereinafter referred to the intermediate fixed contact 62. The intermediate fixed contact 62 is disposed together with the above-described intermediate fixed contact 52 so as to constitute the common intermediate fixed contact of the present disclosure. The respective contact surfaces of the first fixed contacts 51 and 52 and the second fixed contacts 61 and 62 are disposed corresponding to positions of the first movable point 53 and the second movable contact 63 in the moving direction thereof (axial direction). The one end of the suppression resistor 58 is connected to the fixed contact 61 and the other end thereof is connected to the intermediate fixed contact 62.

Figure 4:
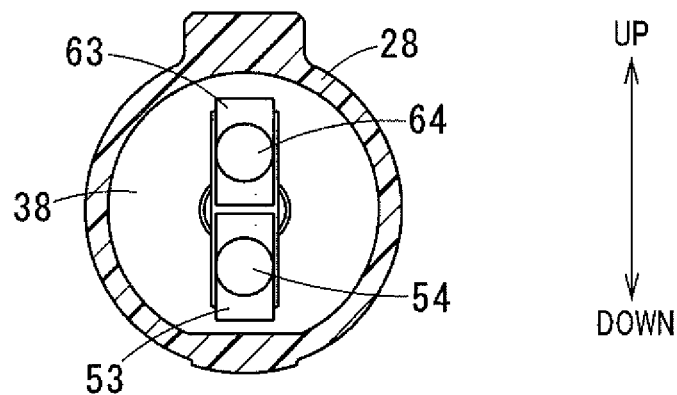
FIG. 4 is a diagram showing a cross-section at a line IV-IV of the electromagnetic solenoid as shown in FIG. 3.

The second movable contact 63 is supported by contact support member 64 disposed at the other end face of the holding disc 34c included in the plunger rod 34 and movably disposed in the axial direction with respect to the contact support member 64. The second movable contact 63 is urged towards anti-holding member side (right side direction in FIG. 3) by a contact pressure spring 65 disposed between the second movable contact 63 and the holding disc 34c. Since the configuration of the contact support member 64 is identical to the configuration of the contact support member 54, the detailed explanation thereof is omitted. However, assuming the distance between the first movable contact 53 and the first fixed contacts 51 and 52 is L1, and the distance between the second movable contact 63 and the second fixed contacts 61 and 62 is L2, the relationship L1>L2 is satisfied (FIG. 3). As shown in FIG. 4, the above-described first movable contact 53 and the second movable contact 63 are disposed with a predetermined gap in the longitudinal direction of the contacts (up-down direction as shown in FIG. 4) and supported by the contact support members 54 and 64 respectively.

As shown in FIG. 3, the second regulation member 59 is disposed to face the second movable contact 63 in the axial direction. The second regulation member 59 is driven to be at a regulated position (described as follows) when the second solenoid 60 operates and returned to the released position while the second solenoid 60 is not operating. The regulated position is a position where movement of the second movable contact 63 is regulated when the second switch is closed, so as to allow the second movable contact 63 to come into contact with the second regulation member 59 while there is a gap between the second movable contact 63 and the second fixed contacts 61 and 62, thereby controlling the second movable contact 63 and the second fixed contacts 61 and 62 not to contact each other. The released position is a position where the second movable contact 63 and the second fixed contacts 61 and 62 are allowed to contact each other, when the second movable contact 63 is released from the regulated position. Specifically, the released position is located at anti-movable contact side with respect to the contact surface of the second fixed contacts 61 and 62.

As shown in FIG. 6, the second solenoid 60 includes a coil 66 that forms an electromagnet (hereinafter is referred to second electromagnet) when the second solenoid 60 is energized and a plunger 67 that moves towards the axial direction in response to ON/OFF operation of the second electromagnet. The second regulation member 59 operates linking with the plunger 67. It is noted that the ON/OFF operation of the second electromagnet is identical to the energizing/de-energizing of the coil 66. The second solenoid 60 pulls the plunger 67 to be stuck therewith before the second movable contact 63 comes into contact with the second regulation member 59, when the second solenoid 60 forms the second electromagnet to pull the plunger 67 thereby driving the second regulating member 59, in response to the movement of the plunger 67, to be at the regulated position. While the second solenoid 60 regulates movement of the second moveable contact 63, the pressing load of the contact pressure spring 65 that presses the second movable contact 63 is apparently smaller than the force that regulates the movement of the second movable contact 63.

The operating time of the first solenoid 50 and the second solenoid 60 (i.e., ON-OFF operations of the first electromagnet and the second electromagnet) is controlled by an IC 68 included in the electromagnetic solenoid 8. As shown in FIG. 3, the IC 68 is disposed at anti-movable contact side in the axial direction with respect to the plate-shaped fixed contact 51 which is inserted into the contact point room 38 from the side surface of the switch cover 28 (back side of the first solenoid 50 in FIG. 3). In the electromagnetic solenoid 8, when the above-described starter relay 46 is closed, power is supplied to the terminal-50 37 from the battery 47 and then, the main solenoid 26, the first solenoid 50, the second solenoid 60 and the IC 68 are powered via the terminal-50 37. That is, the wiring from the single terminal, i.e., the terminal-50 37 is led (branched) to the main solenoid 26, the first solenoid 50, the second solenoid 60 and the IC 68 inside the switch cover 28. It is noted that the IC 68 corresponds to the control circuit.

Next, the operation of the starter is now described as follows. Hereinafter is described the operation of the starter 1 when the engine is restarted in response to the restart request of the driver after the engine is automatically stopped during the idle stop operation. The ECU 48 controls the starter relay 46 to be closed when the engine restart request is received. When the starter relay 46 is closed, power is supplied to the terminal-50 37 from the battery 47 so as to distribute the power to the main solenoid 36, the first solenoid 50, the second solenoid 60 and the IC 68. Regarding the main solenoid 26, when the main electromagnet is formed by energizing the coil 29, the plunger 33 pushes the return spring 35 to be compressed and being pulled by the fixed iron core 31 whereby the plunger 33 is moved.

When the plunger 33 is moved, the pinion 6 is pushed out towards the anti-motor direction (towards left side in FIG. 1) on the output shaft 4 by the shift lever 25. Then, the end face in the axial direction of the pinion 6 comes into contact with the end face in the axial direction of the ring gear 24 and movement of the pinion 6 is stopped. It is possible that the pinion 6 engages with the ring gear 24 smoothly without coming into contact from each other, however, this engaging is unlikely to happen. Usually, the end face of the pinion 6 comes into contact with the end face of the ring gear 24. Meanwhile, when the plunger rod 34 is pushed out together with movement of the plunger 33, the first movable contact 53 and the second movable contact 63 supported by the holding disc 34c via the contact support member 54 and 64 move towards the first fixed contacts 51 and 52, and the second fixed contacts 61 and 62.

Figure 7:
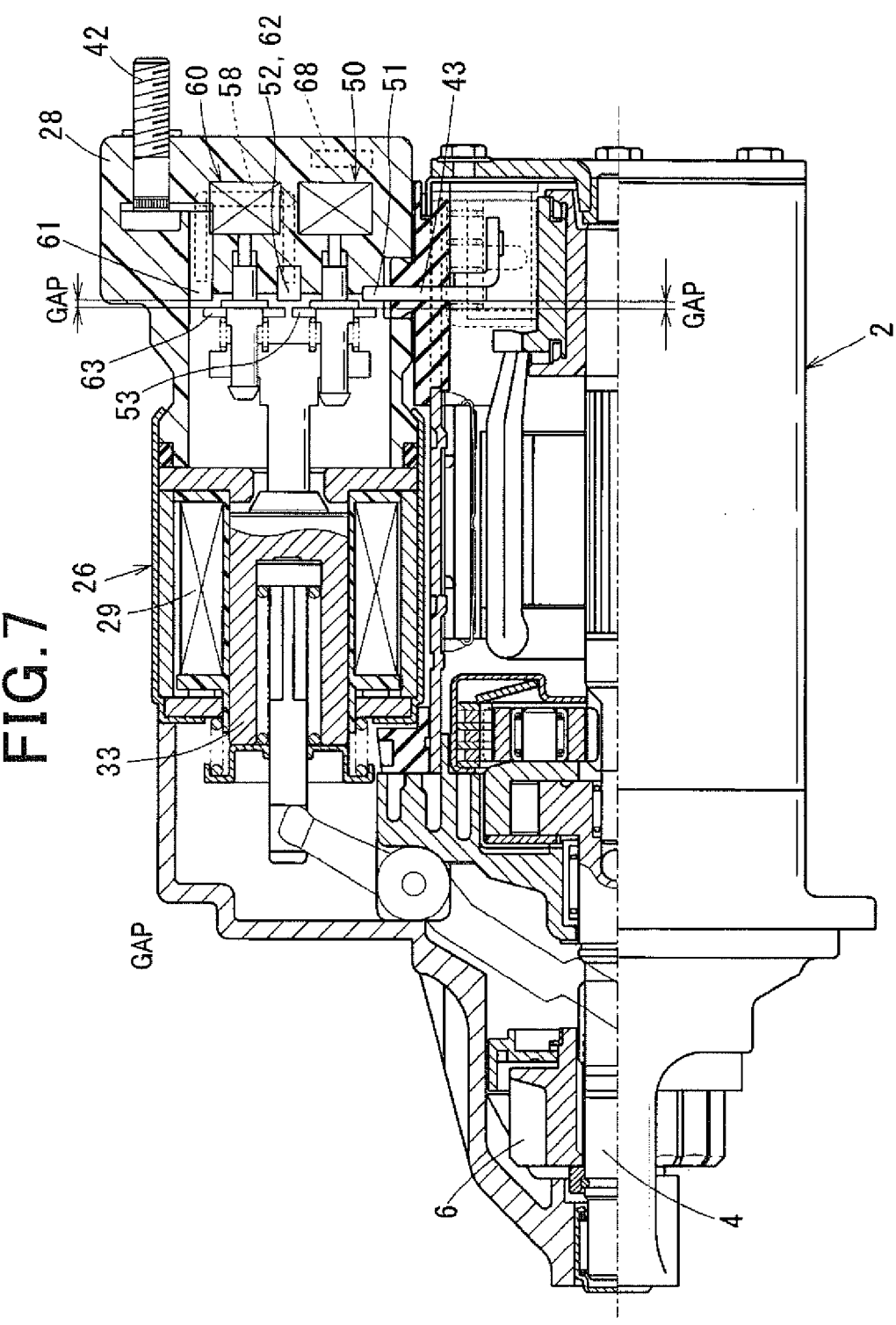
FIG. 7 is a diagram showing a half cross-section of the starter in a state where movement of the first movable contact and the second movable contact are regulated before the first switch and the second switch is closed in response to activation of the main solenoid.
Figure 8:
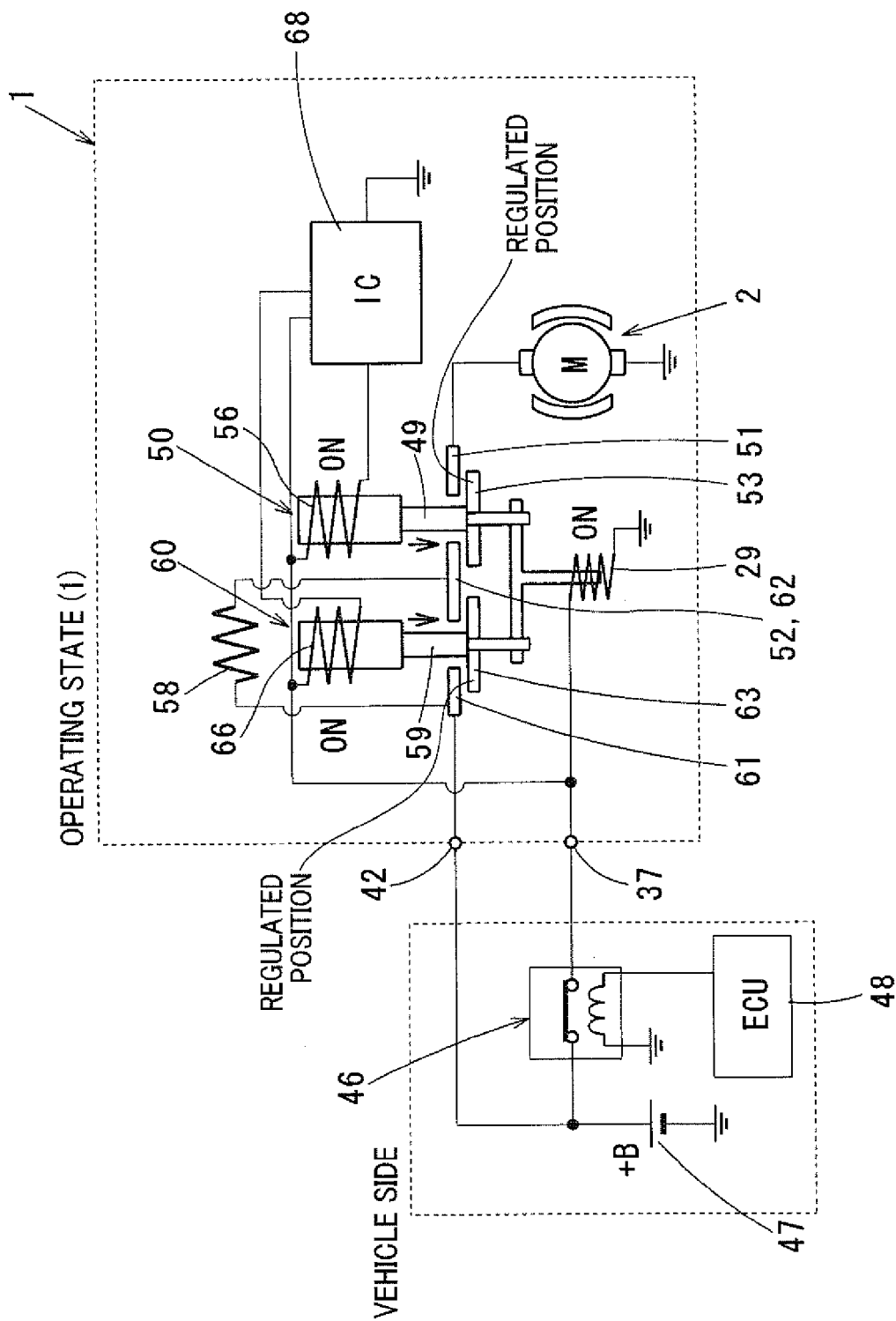
FIG. 8 is a circuit diagram corresponding to the starter as shown in FIG. 7.

The first solenoid 50 and the second solenoid 60 drive the first regulation member 49 and the second regulation member 59 to be at the regulated position before the main solenoid 26 operates to close the first switch and the second switch, thereby regulating movement of the first movable contact 53 and the second movable contact 63. As a result, as shown in FIG. 7, the first movable contact 53 together with the contact support member 54 moves in the axial direction against the holding disc 34c. Then, due to this movement, the contact pressure spring 55 is compressed so as to make a gap between the first movable contact 53 and the first fixed contacts 51 and 52 and the gap is kept while the contact pressure spring is compressed. In other words, as shown FIG. 8, since the first switch and the second switch are not closed, current does not flow through the activation circuit of the motor 2. It is in noted that FIG. 8 is a circuit diagram when the starter is operating where the main solenoid is turned ON and the first and second switch are still open.

Regarding the first solenoid 50, when the plunger 33 of the main solenoid 26 is pulled to the fixed iron core 31 and a predetermined time (e.g., more than approx. 10 milliseconds and up to approx. 200 milliseconds) elapses, the coil 56 is de-energized to turn OFF the first electromagnet. When the first solenoid 50 stops the operation, the plunger 57 is pushed back by reaction force of the return spring (not shown) to allow the first regulation member 49 to return to the released position, thereby releasing the first movable contact 53 from the regulated position. As a result, as shown in FIG. 9, the first movable contact 53 comes into contact with the first fixed contacts 51 and 52 and then, by being urged by the contact pressure spring 55, the first switch is closed.

Figure 9:
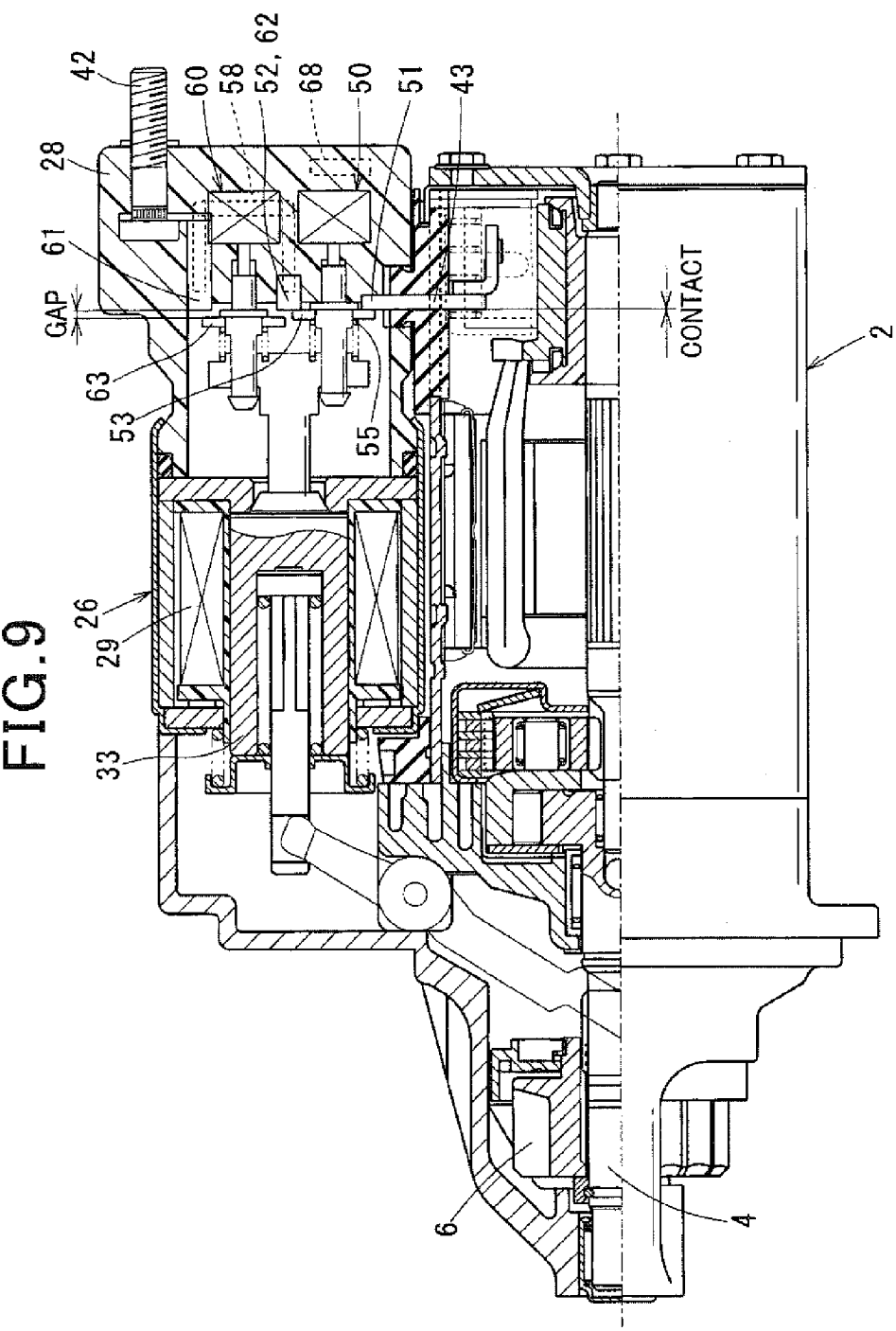
FIG. 9 is a diagram showing a half cross-section of the starter in a state where regulation of the movement of the first movable contact is released when the plunger of the main solenoid is suctioned.
Figure 10:
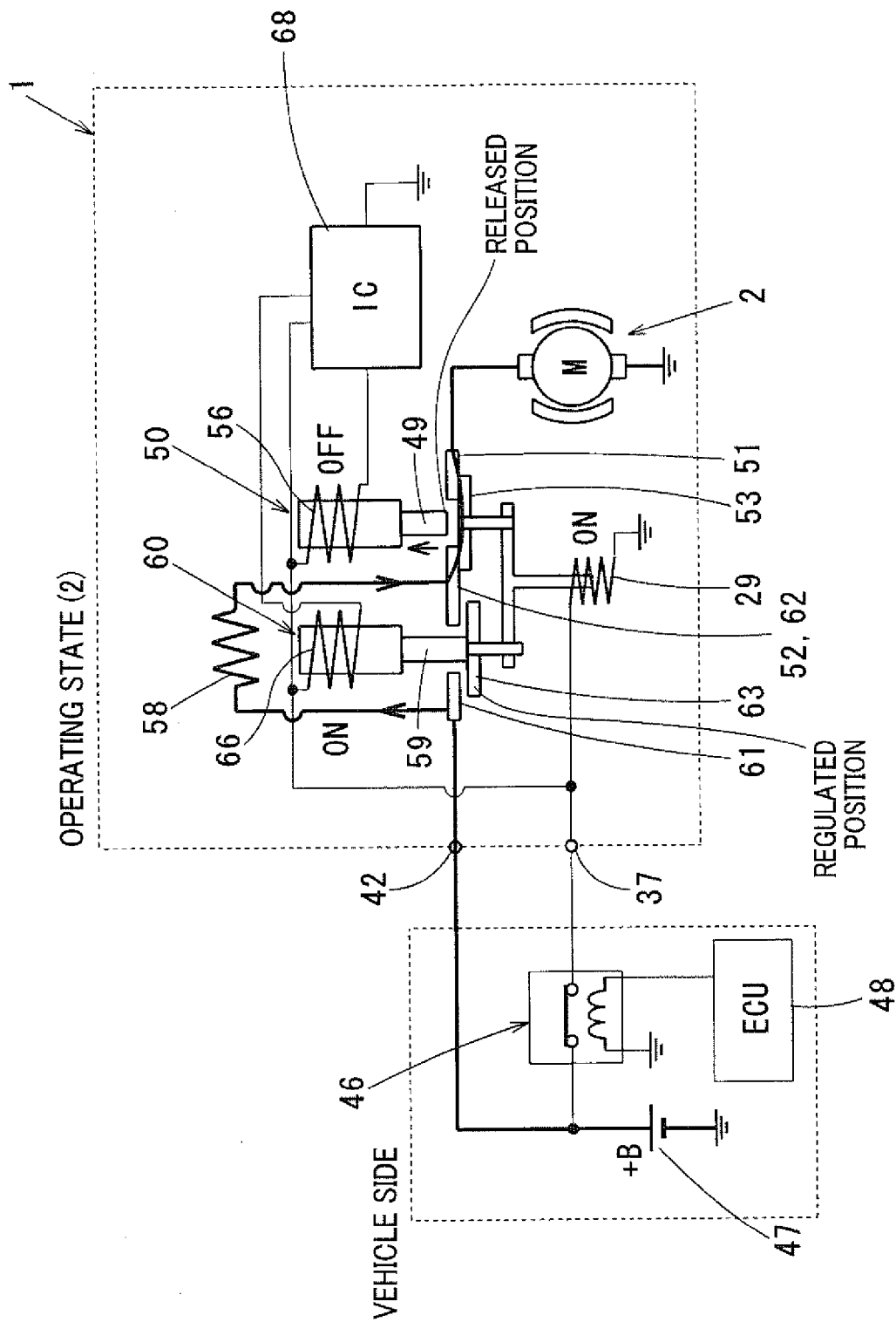
FIG. 10 is a circuit diagram corresponding to the starter as shown in FIG. 9.

FIG. 10 is a circuit diagram corresponding to the starter as shown in FIG. 9, where the main solenoid is turned ON, the first switch is closed and the second switch is opened.

At the time when the first switch is closed, movement of the second movable contact 63 has been regulated by the second regulation member 59. In other words, since the second solenoid 60 is operating, the second switch is opened. When the first switch is closed during the second switch being opened, a high resistive path is formed in the activation circuit of the motor 2. Therefore, as shown in FIG. 10, current suppressed by the suppression resistor 58 is supplied to the motor 2 from the battery 47, whereby the terminal voltage of the battery 47 can be avoided from suffering significant voltage drop. Also, when the motor 2 rotates at lower rotational speed with the suppressed current and the rotational force is transmitted to the pinion 6, the pinion 6 rotates to be at a position where the pinion 6 can be engaged with the ring gear 24, i.e., a position where a tooth of either pinion or ring gear reaches a gap between two teeth (inter-teeth gap) of ring gear or pinion and the one tooth comes into the inter-teeth gap, whereby the pinion engages with the ring gear 24.

Figure 11:
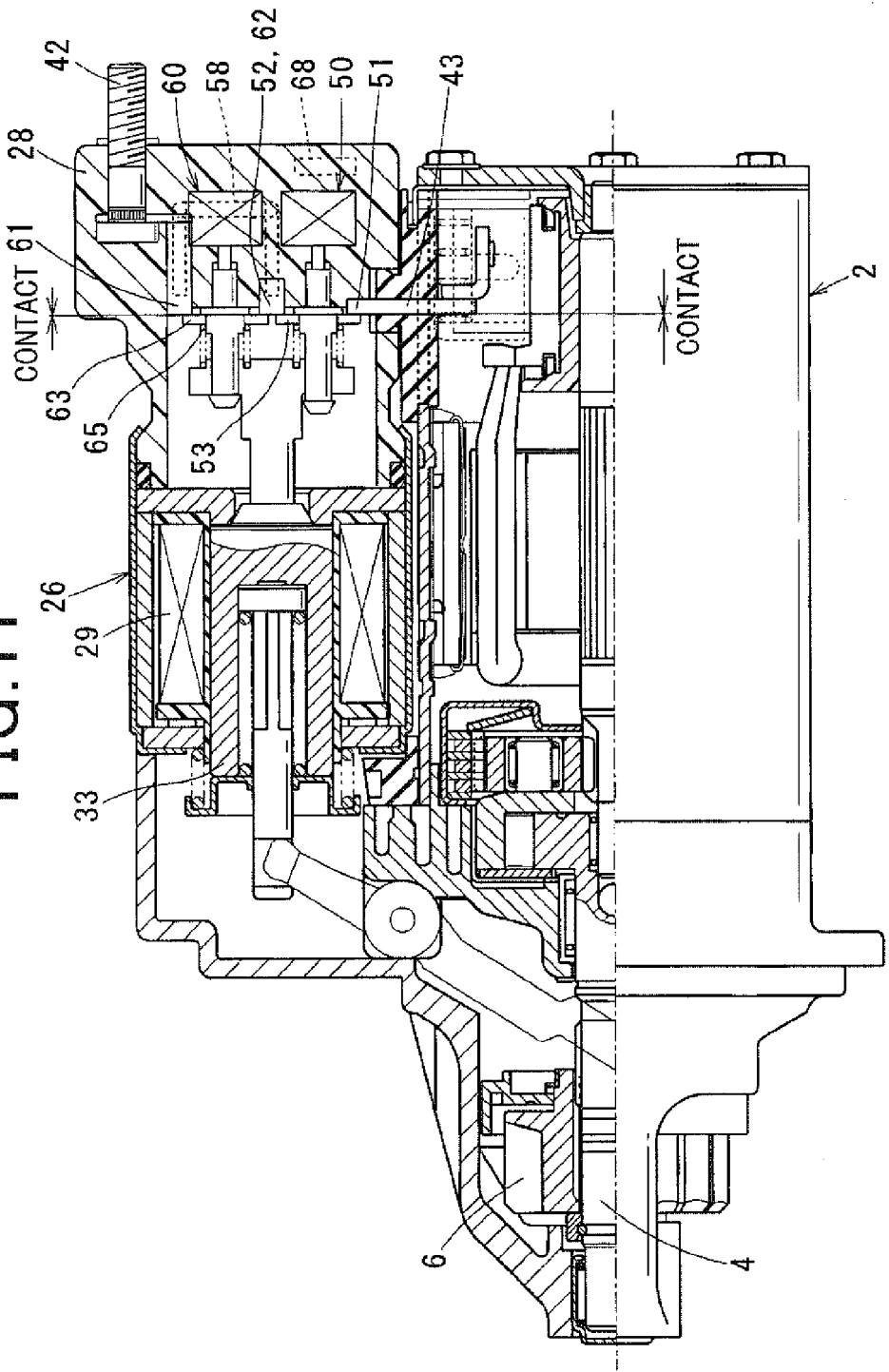
FIG. 11 is a diagram showing a half cross-section of the starter in a state where the movement of the first movable contact and the second movable contact are released.
Figure 12:
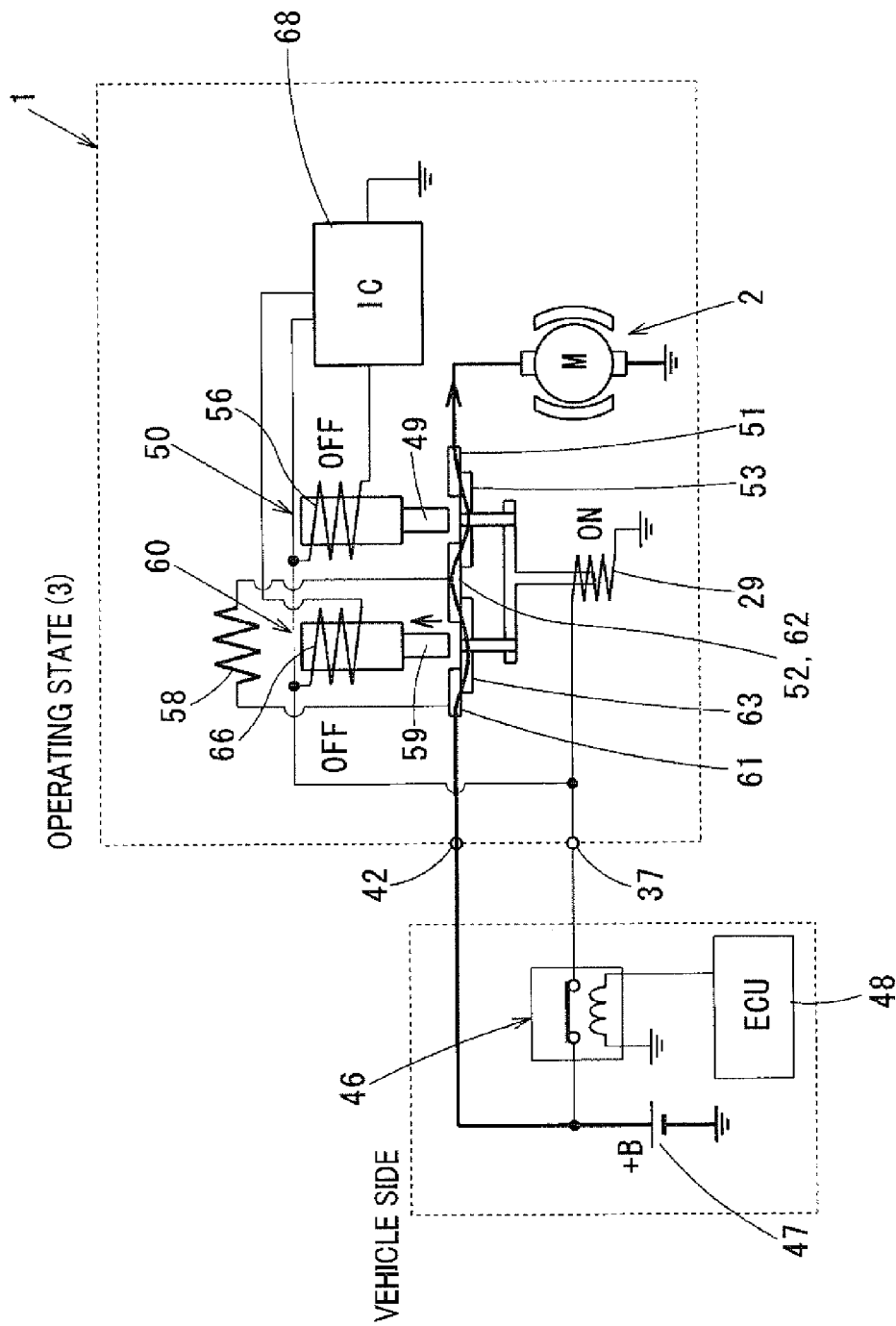
FIG. 12 is a circuit diagram corresponding to the starter as shown in FIG. 11.
Figure 13:
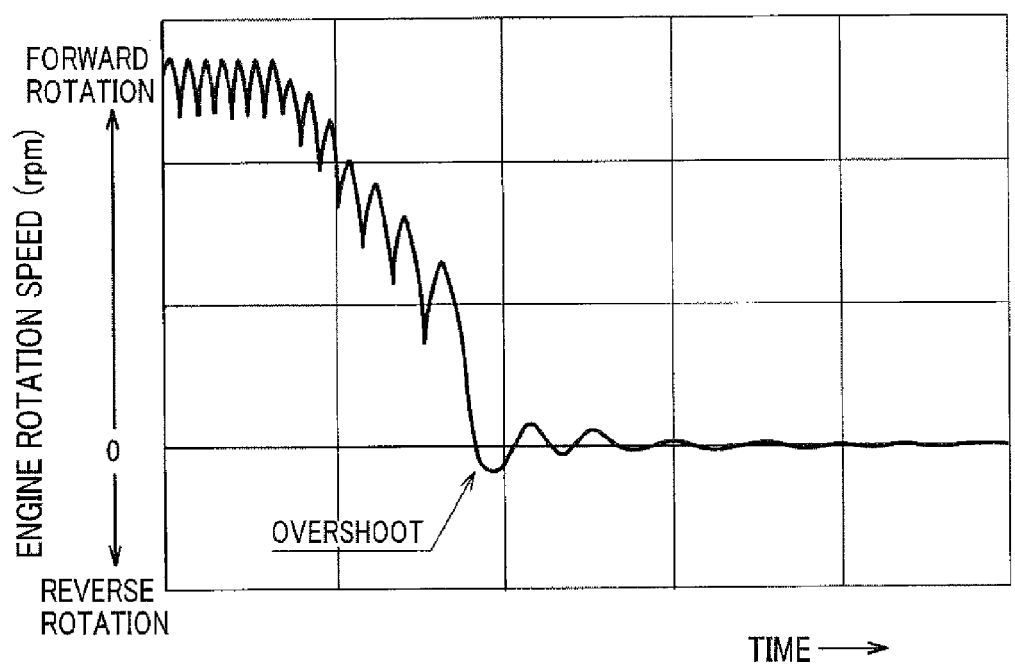
FIG. 13 is a graph showing an engine speed when the engine behavior state an overshoots (reverse rotation) immediately before the engine is stopped.

Regarding the second solenoid 60, when the first switch is closed and a predetermined time (e.g., more than approx. 10 milliseconds and up to approx. 200 milliseconds) elapses, the coil 66 is de-energized to turn OFF the second electromagnet. When the second solenoid 60 stops the operation, the plunger 67 is pushed back by reaction force of the return spring (not shown) to allow the second regulation member 59 to return to the released position, thereby releasing the second movable contact 63 from the regulated position. As a result, as shown in FIG. 11, the second movable contact 63 comes into contact with the second fixed contacts 61 and 62 and then, by being urged by the contact pressure spring 55, the second switch is closed. As a result, since a short-circuit path that short-circuits both ends of the suppression resistor 58 is formed, as shown in FIG. 12, the motor is powered directly from the battery 47 without current flowing through the suppression resistor 58. In other words, since whole voltage of the battery 47 is applied to the motor 2, the motor 2 rotates at high rotational speed so that the rotational force of the motor 2 is transmitted to the pinion 6 and the ring gear 24 thereby cranking the engine. It is noted that FIG. 12 is a circuit diagram corresponding to the starter as shown in FIG. 11, where the main solenoid is turned ON, the first switch and second switch are closed.

As described, a starter operation in which the engine is restarted when the engine is automatically stopped due to idle stop function is exemplified. However, the starter operation of the present disclosure can be adapted to a change of mind control or an idle stop control during vehicle-deceleration described as follows. The change of mind control is, for example, the engine is controlled to be restarted based on the restart request of the driver, while the vehicle has been stopped (FIG. 13), under a condition that the engine is not completely stopped including a rotational region where the engine is rotating in a reverse direction due to overshooting of the engine occurring immediately before the complete stop of the engine. The idle stop control during the vehicle-deceleration is defined as that the engine is controlled to be restarted based on the restart request of the driver while the vehicle speed decreases to be zero, i.e., deceleration period, before the vehicle is completely stopped.

Hereinafter are described effects and advantages of the first embodiment. In the electromagnetic solenoid 8 according to the first embodiment, the first solenoid 50 and the second solenoid 60 (hereinafter is called both solenoids 50 and 60) operate before the first switch and the second switch are closed in response to the operation of the main solenoid 26, whereby movement of the first movable contact 53 and the second movable contact 63 can be regulated. Further, a predetermined delay time is set during a period from when the movement of the first moveable contact 53 is released from the regulated position due to operation stop of the first solenoid 50, to when the movement of the second movable contact 63 is released from the regulated position due to operation stop of the second solenoid 60. During a period from when the movement of the first movable contact 53 is released from the regulated position until when the second movable contact 63 is released from the regulated position, that is, while the second switch that enables the motor 2 to rotate with a high output power is closed after the first switch is closed, current can be supplied to the motor 2 via the suppression resistor 58. Hence, rush current can be suppressed.

As described, the electromagnetic solenoid 8 can reduce occurrence of instantaneous power failures by setting a predetermined delay time while the plunger 33 of the main solenoid 26 is pulled and the first switch and the second switch are closed. Also, after the predetermined delay time elapses, the motor 2 can be rotated with high output power so that the engine can be restarted within a short time. Moreover, since a function that suppresses the rush current is integrated therein, the starter 1 of the present disclosure can be suited to the idle stop function. Since the timing of activation or deactivation of the both solenoids 50 and 60 can be controlled individually, a timing at which the motor is powered via the suppression resistor 58 for controlling the pinion to be pushed out and a timing at which the motor is powered without the suppression resistor 58 can readily be controlled.

Since each of the both solenoids 50 and 60 has relatively short operating time (e.g., more than approx. 10 milliseconds and up to approx. 200 milliseconds), heat generated in the both solenoids 50 and 60 can be significantly reduced compared to solenoids SL1 and SL2 used for conventional ISS switch. As a result, it is not necessary to secure a heat resistant property similar to that of the solenoids SL1 and SL2 so that the both solenoids 50 and 60 can be shrunk. When both solenoids 50 and 60 regulate the movements of the first movable contact 53 and the second movable contact 63 respectively by driving the first regulation member 49 and the second regulation member 59 to be at the regulated position, neither solenoids 50 or 60 regulates the movement of the plunger 33 of the main solenoid 26. Therefore, regulation force of the both solenoids 50 and 60 in order to regulate the movement of the first movable contact 53 and the second movable contact 63 does not necessarily exceed an amount of force of the main electromagnet being applied to the plunger 33, whereby size of the both solenoids 50 and 60 can be shrunk.

Further, while the first solenoid 50 is operating, that is, the first movable contact 53 is regulated by the first regulation member 49, the first movable contact 53 does not come into contact with the first fixed contacts 51 and 52 so that the battery voltage is not applied to the motor 22. Specifically, while the first solenoid 50 is operating, the motor 2 is not powered so that significant voltage drop at the battery due to rush current does not occur. Hence, it is not necessarily consider the voltage drop due to rush current when the first solenoid 50 is operating whereby size of the first solenoid 50 can be further shrunk.

While the second solenoid 60 is operating, the movement of the second movable contact 63 is regulated and the second switch is opened. Hence, when the movement of the first movable contact 53, by the first solenoid 50, is released from the regulated position so as to close the first switch, the motor 2 is supplied with current from the battery 47 via the suppression resistor 58. That is, rush current flowing into the motor 2 when the first switch is closed can be significantly reduced so that influence of the voltage drop caused by the rush current is minimized. As a result, the second solenoid 60 can be further shrunk.

Further, the both solenoids 50 and 60 are configured such that the plungers 57 and 67 are pushed out when the first electromagnet and the second electromagnet are formed in response to the operation of the both solenoids 50 and 60 so as to drive the first regulation member 49 and the second regulation member 50 to be at the regulated position. For this reason, assuming the first solenoid 50 is in a fault condition (i.e., the first solenoid 50 cannot operate even when the power is supplied thereto) the first regulation member is not driven to the regulated position. Similarly, the second solenoid 60 cannot operate even when the power is supplied to the second solenoid 60, the second regulation member 59 is not driven to the regulated position. In this case, the electromagnetic solenoid 8 can operate as similar to the non-ISS switch. Therefore, even when either one solenoid between the both solenoids 50 and 60 has a fault, the fault does not immediately cause a malfunction of the starter operation. As a result, robustness of the electromagnetic solenoid 8 can be enhanced and also, small sized and light weight electromagnetic solenoid 8 can be constituted.

The regulation force of the first solenoid 50 and the second solenoid 60 which respectively regulate the movements of the first movable contact 53 and the second movable contact 63 is set larger than the pressing load of the contact pressure spring 55 and the contact pressure spring 65 which press the first movable contact 53 and the second movable contact 63. In other words, since the regulation force of the first solenoid 50 and the second solenoid 60 only require an amount of force slightly larger than the pressing loads of the contact pressure spring 55 and the contact pressure spring 65 which press the first movable contact 53 and the second movable contact 63 respectively, the size of the first solenoid 50 and the second solenoid 60 can be shrunk.

Further, the first solenoid 50 is constituted such that when the first solenoid 50 pulls the plunger 57 so as to drive the first regulation member 49 to be at the regulated position, the first solenoid 50 pulls the plunger 57 before the first movable contact 53 comes into contact with the first regulation member 49 (i.e., the plunger 57 is pulled to be contact with the fixed iron core (not shown)). Similarly, the second solenoid 60 is constituted such that when the second solenoid 60 pulls the plunger 67 so as to drive the second regulation member 59 to be at the regulated position, the second solenoid 60 pulls the plunger 67 before the second movable contact 63 comes into contact with the second regulation member 59. With these configurations, in both solenoids 50 and 60, an amount of regulation force required for regulating the first movable contact 53 and the second movable contact 63 with the first regulation member 49 and the second regulation member 59 can be smaller. Specifically, required regulation force for the both solenoids 50 and 60 can be made by absorption force of the plungers 57 and 67 which is larger than that of the first electromagnet and the second electromagnet which pulls the plungers 57 and 67 being located apart from the respective fixed iron core. Therefore, compared to the configuration regulating by using the plungers 57 and 67 which are located apart from the fixed iron core, the absorption force of the plungers 57 and 67 can be set to be smaller so that the both solenoids 50 and 60 can be shrunk.

Moreover, regarding the first switch and the second switch, the distance between the contact points of the second switch (i.e., distance between the second fixed contacts points 61, 62 and the second movable contact 63) is larger than that of the first switch (i.e., distance between the first fixed contacts points 51, 52 and the second movable contact 53). Specifically, the contact surface of the first fixed contacts 51 and 52 and the contact surface of the second fixed contacts 61 and 62 is disposed at the same position with respect to the direction along which the first movable contact 53 and the second movable contact 63 move and, while the coil 29 of the main solenoid 26 is not energized, the contact surface of the first movable contact point 53 is disposed to be fixed contact side against the contact surface of the second movable contact 63. Thus, the distance L2 between the second movable contact 63 and the second fixed contacts 61 and 62 is set to be larger than the distance L1 between the first movable contact 53 and the first fixed contacts 51 and 52 (L1<L2).

According to the above-described configuration of the contact points, when the operation of the starter 1 is stopped, i.e., the starter relay 46 is opened, the first switch is opened before the second switch is opened. Thus, when the first movable contact 53 moves apart from the first fixed contacts 51 and 52, the first switch cutoffs only low current that has been flowing into the motor 2 via the suppression resistor 58. Therefore, compared to a case where the whole current flowing into the motor 2 without the suppression resistor 58 is cutoff, stress applied to the first switch can be reduced. As a result, durability of the contact point at the switch 1 can be significantly enhanced. Since the durability of the contact point is enhanced, the size of the first movable contact 53 and the first fixed contacts 51 and 52 can be shrunk so that the size of the electromagnetic solenoid 8 can be shrunk as well.

Also, since the first switch and the second switch include both intermediate fixed contacts 52 and 62 to be integrated from each other, a structure that connects the intermediate fixed contact 52 and the intermediate fixed contact 62 is not necessary. Therefore, the contact point room 38 of the switch cover 28 can be shrunk so that the size of the electromagnet solenoid 8 can be shrunk as well. In the electromagnetic solenoid 8 according to the first embodiment, a battery harness having large heat capacity is connected to the B terminal fixed to the switch cover 28. In this case, when the ambient temperature is decreased, the temperature of the harness is decreased before the temperature of the starter body is decreased so that the temperature of the B terminal 42 that connects the harness is decreased first. Accordingly, condensation is likely to occur at the surface of the fixed contact 61 being connected to the B terminal 42 in the contact point room 38, thereby causing a conduction failure if the condensation dew is frozen. In this respect, according to the conventional ISS switch, the absorption force of the solenoid is required to be larger so as to make a large impact when the movable contact comes into contact with the fixed contact, thereby crushing the ice on the fixed contact.

In contrast, in the configuration of the first embodiment, both ends of the suppression resistor are connected to the fixed contact 61 and 62. In other words, since the suppression resistor having lower thermal conductivity is connected between the fixed contact 61 and the intermediate contact 62, compared to the fixed contact 61, it is difficult to cool the intermediate fixed contact 62 immediately. As a result, even when the ambient temperature is decreased, condensation is unlikely to occur at the surface of the intermediate fixed contact 62 so that freezing of the condensation is unlikely to occur as well. Assuming the surface of the fixed contact 61 is frozen, causing a temporary conduction failure, since the first switch is closed to allow current to flow through the suppression resistor 58 thereby generating heat generation at the suppression resistor 58, the generated heat can melt the ice. Hence, electrical conduction can be secured in the electromagnetic solenoid. Therefore, an amount of absorption force of the main solenoid to crush the ice on the contact surface can be reduced so that the size of the electromagnetic solenoid 8 can be further shrunk.

Since the IC 68 that controls the operating time of the both solenoids 50 and 60 is integrated to the electromagnetic solenoid 8, it is not necessary to control the operation timing in the vehicle side so that the operation timing is controlled by only the starter 1. In this case, the control in the vehicle side can be accomplished the same as the control of the starter 1 having non-ISS switch. Therefore, the control of the ISS system can be simplified.

Further, the electromagnetic solenoid 8 does not need to control the main solenoid 26 and the both solenoids 50 and 60 individually so that the terminal-50 37 is not necessary to have two terminals like the ISS switch. In other words, the terminal-50 37 can be one terminal like the non-ISS switch so that the electrical wiring from the terminal-50 37 can be branched to connect the main solenoid 26, the both solenoids 50 and 60 and the IC 68, whereby the vehicle side harness and the starter relay 46 are not necessarily separated to have 2 different systems, so that the electromagnetic solenoid 8 can be constituted by, as similar to the non-ISS switch, a pair of harness and the starter relay 46. Hence, the ISS system can be constituted with low cost. Furthermore, since the terminal-50 37 is configured as one terminal, the shape of the connector 45 of the terminal-50 37 can be the same shape of the non-ISS switch, whereby the connector 45 does not become larger like the ISS switch so that the mountability thereof can be enhanced.

The starter 1 according to the first embodiment, since a function in the conventional ICR relay (a function to suppresses rush current) is integrated to the electromagnet solenoid 8, a harness that connects the starter 1 and the ICR relay is not necessary so that voltage drop at the harness (resistor-loss of the harness) becomes zero. As a result, compared to a case where the ICR relay and the starter 1 are combined, the output capability of the starter 1 can be enhanced. Moreover, compared to a case where the ICR relay is disposed in the activation circuit of the motor 2 other than in the electromagnet solenoid 8, the number of components is reduced so that system cost can be reduced and no areas for ICR relay to be mounted is necessary so that the mountability of the starter 1 is improved.

According to the first embodiment 1, the M terminal 43 is formed by a plate-shaped member being made of metal, one end side of the plate-shape member is inserted to the contact point room 38 from the side surface of the switch cover 28 and the other end side of the plate-shape member is inserted inside the motor 2 and then, the M terminal 43 is electrically connected to the brush 13 of the positive terminal side. In this case, compared to a case where the M terminal 43 has a bolt-shape as similar to the B terminal 42, at a position where the bolt-shape M terminal 43 is disposed to be penetrated into the switch cover 28 in the axial direction, a space for the IC 68 being mounted can be secured. As a result, necessary components can be effectively arranged inside the switch cover 28, thereby contributing shrinking the electromagnetic solenoid 8.

Hereinafter is described other embodiments of the present disclosure, i.e., embodiments 2 and 3. It is noted that the same components used in the first embodiment to be shared in the embodiments 2 and 3 are applied with the same reference numbers of the first embodiment, and the explanation thereof is omitted.

Second Embodiment

Figure 14:
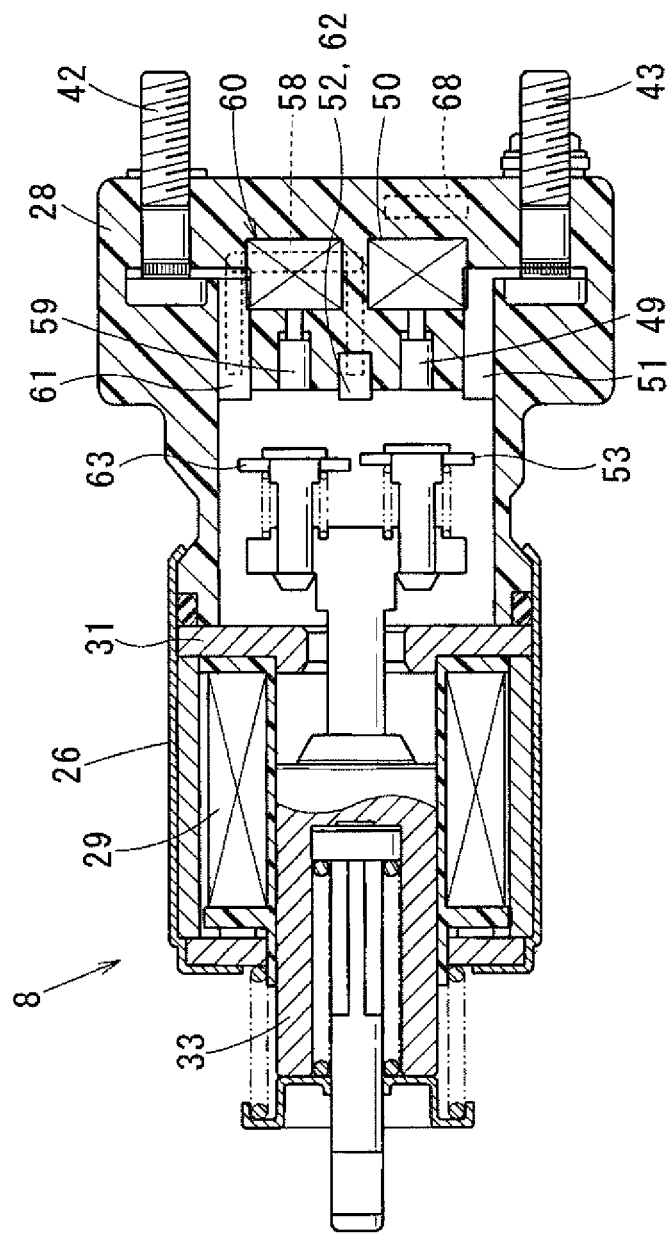
FIG. 14 is a diagram showing a half cross-section of the electromagnetic solenoid according to the second embodiment.

According to the second embodiment, as shown in FIG. 14, the shape of the M terminal 43 is the same as that of B terminal described in the first embodiment. In this case, regarding the first solenoid 50 and the second solenoid 60, negative terminal side of both the coil 56 and the coil 66 can be readily connected to the M terminal 43 inside the switch cover 28 and can be connected to the ground (earth) from the M terminal 43 via the motor 2.

The IC 68 that controls the operating time of the both solenoids 50 and 60 are connected in series to the operation circuit of the both solenoids 50 and 60. In other words, the IC 68 is connected between the both solenoid 50 and 60 and the ground, or connected between the terminal-50 37 and the both solenoids 50 and 60.

Regarding the M terminal 43 having bolt-shape according to the second embodiment, as similar to that of the conventional ISS switch or the non-ISS switch, a terminal of the motor lead (not shown) is connected to the male screw portion protruded from the switch cover 28 in the axial direction. The anti-terminal side of the motor lead is inserted inside the motor 2 penetrating the grommet 44 (not shown) and electrically connected to the positive terminal side of the brush 13. Thus, since the both solenoids 50 and 60 can be connected inside the switch cover 28. Hence, the electromagnetic solenoid 8 can be constituted with a simple structure in which the switch cover 28 can be mounted to the main solenoid 26 easily.

Third Embodiment

According to the third embodiment, a structure of the starter 1 is exemplified. In the structure, at least the first solenoid 50 is connected to the M terminal 43 as similar to that of the second embodiment, and having longer operating life as similar to that of the brush 13.

The starter 1 that uses the commutator motor 2 cannot accurately detect the operating life of the brush 13. Hence, the number of operating times is counted in the vehicle side and the ECU 48 prompts the user to exchange the starter 1 when the number of operating times reaches a predetermined value (life time operating count). In this case, since the brush 13 is designed to have enough margin in its operating life to meet the estimated operating life (i.e., not less than estimated operating times) of the starter 1, the brush 13 cannot be used effectively until the operating life thereof.

Figure 15:
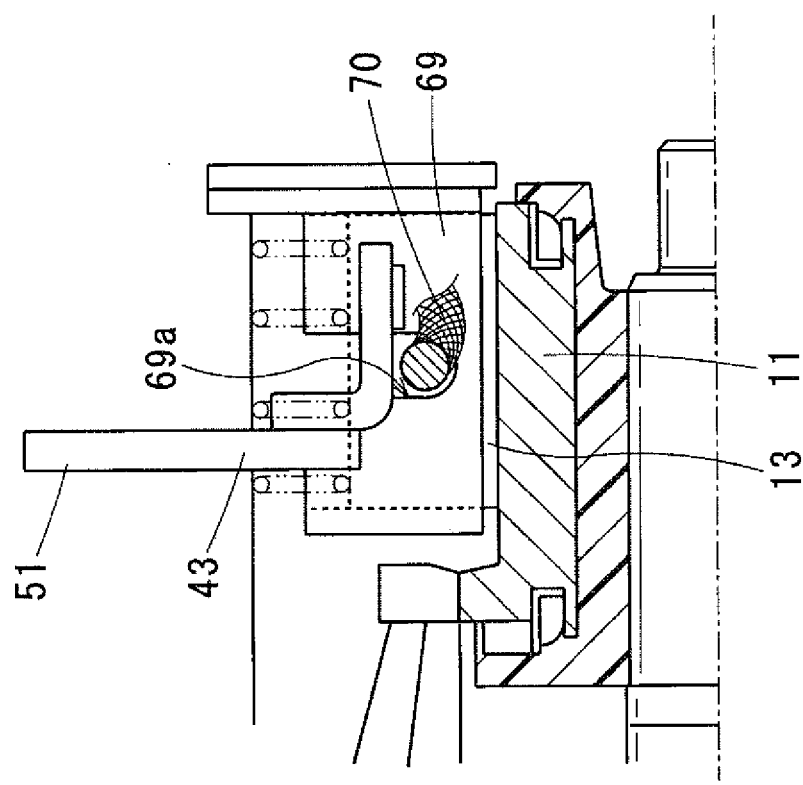
FIG. 15 is a diagram showing a cross-section that indicates a structure vicinity of the brush according to the third embodiment.
Figure 16:
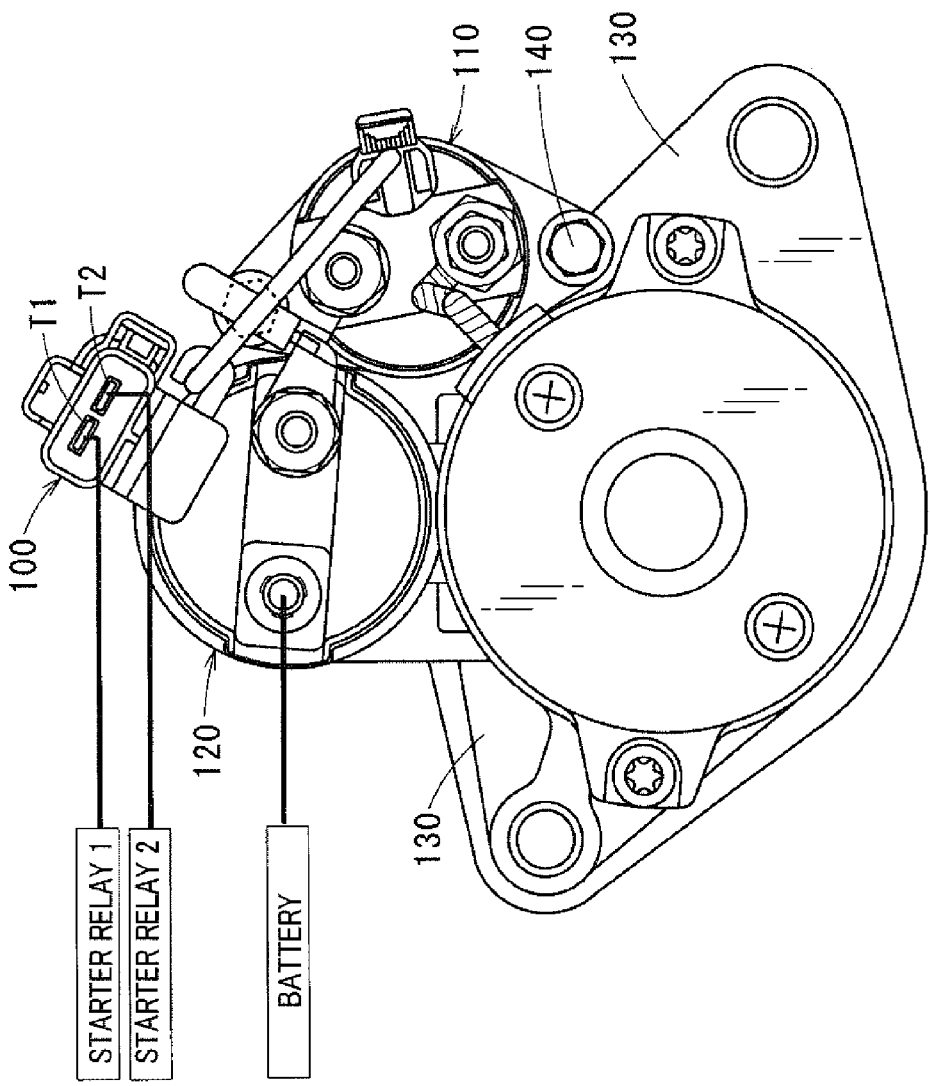
FIG. 16 is a diagram showing a rear view of a conventional type starter viewing from anti-pinion side with respect to the axial direction of the starter.

Meanwhile, when the brush 13 wears to reach around the operating life, a contact pressure between the commutator 11 and the brush 13 is decreased so that the contact resistance rapidly increases, thereby degrading the performance of the motor 2. However, since the starter 1 is usually designed to utilize the maximum output power at low temperature, the starter 1 has enough capability at the normal temperature to achieve required performance for restarting the engine. Therefore, even when the brush 13 wears and degrades the performance when near its operating life, the starter 1 still can start the engine. Accordingly, the starter 1 of the third embodiment is designed to have a configuration such that contact between the commutator 11 and the brush 13 becomes unstable before the motor 2 is not able to restart the engine due to wear of brush 13 reaching the operating life. Specifically, as shown in FIG. 15, a hooking between a brush holder 69 that holds the brush 13 and a brush pigtail 70 can be employed. In other words, an U-shape groove 69*a* used for picking the brush pigtail 70 up is formed at the side surface of the brush holder 69. When the brush 13 is worn to be about the operating life, the brush pigtail 70 is hooked at a bottom portion of the U-shape groove 69*a*.

Here, regarding the first solenoid 50, the negative side of the first solenoid 50 is connected to the M terminal 43 and connected to the ground via the motor 2 so that the first solenoid 50 cannot operate properly when the contact between the commutator 11 and the brush 13 becomes unstable. In other words, when the contact between the commutator 11 and the brush 13 become unstable, the first solenoid 50 cannot obtain required regulation force because the drive voltage applied to the coil 56 is decreased. In this case, since the first movable contact 53 is not regulated, the timing in order to close the first switch becomes faster, whereby a period from when the starter relay 46 is closed to when the voltage drop due to rush current occurs becomes shorter. The vehicle side ECU 48 detects the timing at which the voltage drop occurs so as to determine whether or not the first solenoid 50 operates properly.

The ECU 48 measures the period from when the starter relay 46 is closed to when the voltage drop caused by rush current occurs and detects the timing where the voltage drop occurs (voltage drop timing) on the period measured by the ECU 48. The ECU 48 determines that the first solenoid 50 has not operated properly when the voltage drop timing is earlier than the normal timing. Also, the ECU 48 can output an alert to the driver when the ECU 48 detects the first solenoid 50 has not operated properly, so that the driver can be notified, even when the brush 13 wears to reach around the operating life, that the starter 1 is required to be exchanged before the starter 1 is unable to start the engine. In this instant, since the starter 1 can be used effectively until around the operating life of the brush 13, the designed margin in the operating life of the brush 13 can be lowered. Therefore, size and weight of the starter 1 can be smaller and lighter.

In the above-described examples, when the contact of between the commutator 11 and the brush 13 becomes unstable, the first solenoid 50 cannot regulate the movement of the first movable contact 53 so that the voltage drop occurs at earlier timing, and the ECU 48 detects the timing where the voltage drop occurs. In other words, it is assumed a case where no fault has been occurred in the first solenoid 50, however, a drive voltage being applied to the coil 56 is decreased so that necessary regulation force to regulate the first movable contact 53 cannot be obtained. In this regard, even when a fault has occurred in the first solenoid 50 and causes an operation failure, compared to the first solenoid 50 operating properly, the timing at which the first switch opens becomes earlier. Accordingly, similar to that of the above-described example, the ECU 48 detects the timing where the voltage drop occurs due to the rush current and determines that the first solenoid 50 cannot operate properly when the detected timing is earlier than normal timing.

As described above, even when the first solenoid 50 cannot operate so that the first movable contact cannot be regulated, fault does not occur in the starter 1 immediately so that the starter 1 can still operate. However, damage to the ring gear 24 increases when the pinion 6 engages with the ring gear 24. Thus, wear of the ring gear is accelerated whereby engaging failure is likely to occur at a timing earlier than the estimated life-time operating count of the starter 1. In this respect, when the vehicle side ECU 48 determines that the first solenoid 50 does not operate properly, the ECU 48 is able to inhibit the ISS operation and alert the driver to an occurrence of fault. Accordingly, the ECU 48 can prompt the driver to exchange the starter 1 before wear of the ring gear 24 unexpectedly increases.

Also, the ECU 48 can determine whether or not the contact between the commutator 11 and brush 13 is unstable because of wear of brush 13 when the voltage drop timing (voltage drop caused by rush current) is earlier than the normal timing or the contact between the commutator 11 and the brush 13 is unstable because fault has been occurred in the first solenoid 50 itself. For example, the ECU 48 can determine that the contact between the commutator 11 and the brush 13 is not unstable, but the first solenoid 50 has a fault when the number of operating times of the starter 1 does not reach a predetermined value.

MODIFICATION

According to the first embodiment, the first switch is disposed at motor 2 side with respect to the second switch. However, the first switch can be disposed at battery 47 side with respect to the second switch. Moreover, according to the first embodiment, the intermediate fixed contact 52 at the first switch side and the intermediate fixed contact 62 at the second switch side are integrated, however, both intermediate fixed contacts 52 and 63 can be formed individually and can be electrically connected with a metal plate. According to the second and third embodiments, negative side of the coils 56 and 66 of the both solenoids 50 and 60 (first solenoid 60 according to the third embodiment) are connected to the M terminal 43 having bolt-shape, however, the negative side of the coils 56 and 66 can be connected to the M terminal 43, described in the first embodiment, i.e., plate-like member made of metal. In other words, even the M terminal 43 is a plate-like member, a lock portion can be disposed in the electromagnet solenoid 8 so as to have the negative side of the coils 56 and 66 connected to the M terminal 43.

What is claimed is:

1. A starter for starting an engine mounted on a vehicle, comprising:
   a motor that generates rotational force by being energized, the motor rotating about a rotational axis thereof;

a pinion that transmits the rotational force of the motor to a ring gear of the engine when the pinion engages with the ring gear; and an electromagnetic solenoid fixed to a starter housing to be disposed parallel to the motor such that the rotational axis of the motor and an axial direction being a longitudinal direction of the electromagnetic solenoid become parallel, wherein the electromagnetic solenoid includes:

a pair of first fixed contacts disposed at an activation circuit of the motor;

a first movable contact facing the pair of first fixed contacts, being movable in the axial direction to open and close the pair of first fixed contacts, the pair of first fixed contacts being closed when the first movable contact contacts with the pair of first fixed contacts and the pair of first fixed contacts being opened when the first movable contact is separated from the pair of first fixed contacts;

a first switch that intermits a current supplied to the motor in response to the first movable contact opening and closing the pair of first fixed contacts, the first switch being opened when the first movable contact opens the pair of first fixed contacts and being closed when the first movable contact closes the pair of first fixed contacts;

a suppression resistor connected to the activation circuit to be in series to the first switch, suppressing rush current flowing into the activation circuit when the first switch is closed;

a pair of second fixed contacts disposed at the activation circuit, bypassing the suppression resistor;

a second movable contact facing the pair of second fixed contacts, being movable in the axial direction to open and close the pair of second fixed contacts, the pair of second fixed contacts being closed when the second movable contact contacts with the pair of second fixed contacts and the pair of second fixed contacts being opened when the second movable contact is separated from the pair of second fixed contacts;

a second switch that short-circuits the suppression resistor to make a short circuit path when the second movable contact closes the pair of second fixed contacts, the second switch releasing the short circuit path when the second movable contact opens the pair of second fixed contacts, the second switch being opened when the second movable contact opens the pair of second fixed contacts and being closed when the second movable contact closes the pair of second fixed contacts;

a main solenoid including a main electromagnet when being energized and a plunger being pulled by the main electromagnet to move in the axial direction, wherein the main solenoid pushes the pinion out towards the ring gear in response to the plunger moving in the axial direction and drives the first movable contact and the second movable contact towards the pair of first fixed contacts and the pair of second fixed contacts;

a first regulation member disposed to be movable between a regulated position and a released position, the regulated position regulating movement of the first movable contact not to contact with the pair of first fixed contacts in response to the first switch being closed, the released position releasing movement of the first movable contact so as to allow the first movable contact to contact with the pair of first fixed contacts;

a second regulation member disposed to be movable between a regulated position and a released position, the regulated position regulating movement of the second movable contact not to contact with the pair of second fixed contacts in response to the second switch being closed, the released position releasing movement of the second movable contact from the regulated position so as to allow the second movable contact to contact with the pair of second fixed contacts;

a first solenoid forming a first electromagnet when being energized, driving the first regulation member to be at the regulated position when the first electromagnet is ON and releasing the first regulation member to be at the released position when the first electromagnet is OFF; and a second solenoid forming a second electromagnet when being energized, driving the second regulation member to be at the regulated position when the second electromagnet is ON and releasing the second regulation member to be at the released position when the second electromagnet is OFF, wherein the first solenoid is configured to control the first is electromagnet to be ON and OFF such that the first regulation member is driven to be at the regulated position before the first switch is closed when the main solenoid starts to operate, so as to regulate the movement of the first movable contact and the first regulation member is released to be at the released position when a predetermined time elapses after the plunger is pulled by the main electromagnet, so as to release the movement of the first movable contact;

the second solenoid is configured to control the second electromagnet to be ON and OFF such that the second regulation member is driven to be at the regulated position before the second switch is closed when the main solenoid starts to operate, so as to regulate the movement of the second movable contact and the second regulation member is released to be at the released position when a predetermined time elapses after the first regulation member releases the movement of the first movable contact, so as to release the movement of the second movable contact.

2. The starter according to claim 1, wherein the first solenoid and the second solenoid include plungers being pulled by the first electromagnet and the second electromagnet respectively thereby allowing the plungers to move in the axial direction;

the first regulation member and the second regulation member are disposed to be movable together with the plungers between the regulated position and the released position; and the plungers are pulled by the first electromagnet and the second electromagnet before the first movable contact and the second movable contact contact with the first regulation member and the second regulation member respectively, when the first regulation member and the second regulation member are driven to be at the regulated position.

3. An engine starting unit including the starter according to claim 2, wherein the engine starting unit includes an operation determining unit that determines whether or not the first solenoid operates properly when the engine is restarted from an idle stop condition;

the operation determining unit measures a period from when the main solenoid and the first solenoid are energized to when a voltage drop caused by rush current occurs in response to the first switch being closed and detects a timing at which the voltage drop occurs based on the period measured by the operation determining unit; and the operation determining unit determines that the first solenoid does not operate properly when the timing detected by the operation determining unit is earlier than a normal timing.

4. The starter according to claim 1, wherein the first switch and the second switch is configured such that when the first moveable contact and the second movable contact are separated from the pair of first fixed contacts and the pair of second fixed contacts respectively in response to an operation stop of the main solenoid, the second movable contact is separated from the pair of first fixed contacts before the first movable contact is separated from the pair of second fixed contacts.

5. An engine starting unit including the starter according to claim 4, wherein the engine starting unit includes an operation determining unit that determines whether or not the first solenoid operates properly when the engine is restarted from an idle stop condition;

the operation determining unit measures a period from when the main solenoid and the first solenoid are energized to when a voltage drop caused by rush current occurs in response to the first switch being closed and detects a timing at which the voltage drop occurs based on the period measured by the operation determining unit; and the operation determining unit determines that the first solenoid does not operate properly when the timing detected by the operation determining unit is earlier than a normal timing.

6. The starter according to claim 1, wherein the electromagnetic solenoid includes a frame having a cylindrical shape and serving as a magnetic circuit of the main solenoid and a switch cover that is fixed to the frame to cover an opening of the frame;

a first connection terminal connected to a battery side of the activation circuit and a second connection terminal connected to a motor side of the activation circuit are fixed to the switch cover;

a B-fixed contact connected to the first connection terminal, a M-fixed contact connected to the second connection terminal, a B-intermediate fixed contact being paired with the B-fixed contact and a M-intermediate fixed contact being paired with the M-fixed contact which are arranged inside the switch cover; and either one of the first fixed contacts or the second fixed contacts is constituted by the B-fixed contact and the B-intermediate fixed contact and the other one of the first fixed contacts or the second fixed contacts is constituted by the M-fixed contact and the M-intermediate fixed contact; and the B-intermediate fixed contact and the M-intermediate fixed contact are electrically connected from each other.

7. The starter according to claim 6, wherein the B-intermediate fixed contact and the M-intermediate fixed contact are integrated to be a common intermediate fixed contact.

8. The starter according to claim 6, wherein one end of the suppression resistor is connected to the B-fixed contact and the other end of the suppression resistor is connected to the B-intermediate fixed contact or the common intermediate fixed contact.

9. The starter according to claim 6, wherein the starter includes a control circuit that controls an operating time of the first solenoid and the second solenoid.

10. The starter according to claim 9, wherein the control circuit is integrated to the electromagnetic solenoid.

11. The starter according to claim 9, wherein the starter includes a conduction terminal connected to the battery via a harness, the conduction terminal is a single terminal at which the harness is connected, and a wiring from the conduction terminal is branched to connect the main solenoid, the first solenoid, the second solenoid and the control circuit.

12. The starter according to claim 9, wherein the second connection terminal is formed by a plate-shaped member being made of metal, one end side of the plate-shape member forms the M-fixed contact inside the switch cover, the other end side of the plate-shape member is protruded in a radial direction being perpendicular to the axial direction from a surface of the switch cover to be inserted into the motor and electrically connected to the brush inside the motor; and the control circuit is disposed in the switch cover to be at an anti-movable contact side in the axial direction with respect to the M-fixed contact.

13. The starter according to claim 6, wherein the first solenoid and the second solenoid are disposed inside the switch cover;

the first solenoid includes a first coil that forms the first electromagnet when being energized and the second solenoid includes a second coil that forms the second electromagnet; and negative sides of the first and the second coils are connected to the second connection terminal to be grounded via the motor.

14. The starter according to claim 6, wherein the first solenoid and the second solenoid are disposed inside the switch cover;

the first solenoid includes a first coil that forms the first electromagnet when being energized and the second solenoid includes a second coil that forms the second electromagnet;

at least the first solenoid is grounded such that a negative side of the first coil is connected to the second connection terminal to be grounded via the motor;

the motor includes a commutator and a brush, the motor is configured such that contact between the commutator and the brush becomes unstable before the motor loses a required performance for restarting the engine due to wear of the brush sliding on an outer periphery of the commutator; and the first solenoid is configured such that a driving voltage applied to the first coil is decreased when the contact between the commutator and the brush become unstable, whereby the first solenoid cannot obtain required regulation force to regulate the movement of the first movable contact by the first regulation member.

15. The starter according to claim 14, wherein the motor is configured such that a brush pigtail of the brush is hooked at a brush holder that holds the brush before the brush wears to reach an operating life thereof, whereby the contact between the commutator and the brush becomes unstable.

16. An engine starting unit including the starter according to claim 1, wherein the engine starting unit includes an operation determining unit that determines whether or not the first solenoid operates properly when the engine is restarted from an idle stop condition;

the operation determining unit measures a period from when the main solenoid and the first solenoid are energized to when a voltage drop caused by rush current occurs in response to the first switch being closed and detects a timing at which the voltage drop occurs based on the period measured by the operation determining unit; and the operation determining unit determines that the first solenoid does not operate properly when the timing detected by the operation determining unit is earlier than a normal timing.

* * * * *